US012063659B2

(12) United States Patent
Yang et al.

(10) Patent No.: US 12,063,659 B2
(45) Date of Patent: Aug. 13, 2024

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 17/422,121

(22) PCT Filed: Aug. 3, 2020

(86) PCT No.: PCT/KR2020/010202
§ 371 (c)(1),
(2) Date: Jul. 9, 2021

(87) PCT Pub. No.: WO2021/066309
PCT Pub. Date: Apr. 8, 2021

(65) Prior Publication Data
US 2022/0132473 A1  Apr. 28, 2022

Related U.S. Application Data

(60) Provisional application No. 62/910,326, filed on Oct. 3, 2019.

(51) Int. Cl.
*H04W 72/23*   (2023.01)
*H04W 72/0453*   (2023.01)
*H04W 76/28*   (2018.01)

(52) U.S. Cl.
CPC ....... *H04W 72/23* (2023.01); *H04W 72/0453* (2013.01); *H04W 76/28* (2018.02)

(58) Field of Classification Search
CPC .. H04W 72/23; H04W 72/0453; H04W 76/28
See application file for complete search history.

(56) References Cited

U.S. PATENT DOCUMENTS

2019/0149380 A1   5/2019  Babaei et al.
2019/0165902 A1*  5/2019  Li ..................... H04L 5/0042
(Continued)

FOREIGN PATENT DOCUMENTS

CN   109952803   6/2019
CN   110034906   7/2019
(Continued)

OTHER PUBLICATIONS

Office Action in Chinese Appln. No. 202080029763.2, dated Apr. 25, 2023, 19 pages (with English translation).
(Continued)

*Primary Examiner* — Deepa Belur
(74) *Attorney, Agent, or Firm* — Fish & Richardson P.C.

(57) ABSTRACT

According to one embodiment of the present invention, a method by which a wireless communication apparatus receives a signal comprises: monitoring control channel candidates in a bandwidth part (BWP) comprising one or more sub-bands (SBs), on the basis of a control channel search-space set (SS) configuration and a control resource set (CORSET) configuration that are associated with each other; and obtaining control information from the control channel detected as the result of monitoring the candidates, wherein, in monitoring of the candidates, the wireless communication apparatus sets the CORESET frequency resource region of each SB in the BWP on the basis of the CORESET frequency resource region of a specific SB in the BWP, and the specific SB can be restricted to one SB located in the lowest frequency, from among the one or more SBs included in the BWP.

15 Claims, 19 Drawing Sheets

(56) References Cited

U.S. PATENT DOCUMENTS

| 2019/0230706 | A1 | 7/2019 | Li et al. |
| 2019/0268883 | A1 | 8/2019 | Zhang et al. |
| 2020/0153541 | A1* | 5/2020 | Faxér .................... H04L 5/0057 |
| 2021/0306986 | A1* | 9/2021 | Takahashi ............. H04W 68/00 |
| 2022/0039158 | A1* | 2/2022 | Awadin ................ H04W 72/23 |
| 2022/0295404 | A1* | 9/2022 | Wang ................. H04W 52/028 |

FOREIGN PATENT DOCUMENTS

| WO | WO 2018/169357 | 9/2018 |
| WO | WO-2020232647 A1 * | 11/2020 |

OTHER PUBLICATIONS

Convida Wireless, "Wideband operation for NR-U," R1-1907464, Presented at 3GPP TSG-RAN WG1 Meeting #97, Reno, USA, May 13-17, 2019, 4 pages.

International Search Report in International Appln. No. PCT/KR2020/010202, dated Nov. 20, 2020, 11 pages (with English translation).

LG Electronics, "Wide-band operation for NR-U," R1-1908539, Presented at 3GPP TSG RAN WG1 #98, Prague, CZ, Aug. 26-30, 2019, 5 pages.

Samsung, "Enhancements on Multi-TRP/Panel Transmission," R1-1904449, Presented at 3GPP TSG RAN WG1 Meeting #96bis, Xi'an, China, Apr. 8-12, 2019, 11 pages.

\* cited by examiner

Non - interleaved CCE - to - REG mapping (a) Carrier aggregation between L-band and U-band (b) standalone U-band(s)

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2020/010202, filed on Aug. 3, 2020, which claims the benefit of U.S. Provisional Application No. 62/910,326, filed on Oct. 3, 2019. The disclosures of the prior applications are incorporated by reference in their entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

According to one aspect of the present disclosure, a method of receiving a signal by a wireless communication device 1 may include monitoring control channel candidates in a bandwidth part (BWP) including one or more subbands (SBs) based on a control channel search space set (SS) configuration and a control resource set (CORESET) configuration which are associated with each other, and obtaining control information from a control channel detected as a result of monitoring the control channel candidates. In monitoring the control channel candidates, the wireless communication device 1 may configure each CORESET frequency resource area in each SB of the BWP based on a CORESET frequency resource area of a specific SB of the BWP. The specific SB may be limited to one SB located at a lowest frequency among the one or more SBs included in the BWP.

According to another aspect of the present disclosure, a processor-readable recording medium recorded thereon a program for performing the above method may be provided.

According to another aspect of the present disclosure, a device for processing a signal for wireless communication may include at least one memory storing one or more instructions, and at least one processor configured to execute the one or more instructions stored in the at least one memory. According to the execution of the one or more instructions, the at least one processor may be configured to monitor control channel candidates in a BWP including one or more SBs based on a control channel SS configuration and a CORESET configuration which are associated with each other, and obtain control information from a control channel detected as a result of monitoring the control channel candidates. In monitoring the control channel candidates, the at least one processor may be configured to configure each CORESET frequency resource area in each SB of the BWP based on a CORESET frequency resource area of a specific SB of the BWP. The specific SB may be limited to one SB located at a lowest frequency among the one or more SBs included in the BWP.

According to another aspect of the present disclosure, the wireless communication device 1 may include a receiver and at least one processor configured to control the receiver. The at least one processor may be configured to monitor control channel candidates in a BWP including one or more SBs based on a control channel SS configuration and a CORESET configuration which are associated with each other, and obtain control information from a control channel detected as a result of monitoring the control channel candidates. In monitoring the control channel candidates, the at least one processor may be configured to configure each CORESET frequency resource area in each SB of the BWP based on a CORESET frequency resource area of a specific SB of the BWP. The specific SB may be limited to one SB located at a lowest frequency among the one or more SBs included in the BWP.

According to another aspect of the present disclosure, a method of transmitting a signal by a wireless communication device 2 may include selecting at least one of control channel candidates in a BWP including one or more SBs based on a control channel SS configuration and a CORESET configuration which are associated with each other, and transmitting a control channel carrying control information in the at least one control channel candidate. The wireless communication device may configure each CORESET frequency resource area in each SB of the BWP based on a CORESET frequency resource area of a specific SB of the BWP. The specific SB may be limited to one SB located at a lowest frequency among the one or more SBs included in the BWP.

According to another aspect of the present disclosure, the wireless communication device 2 may include a transmitter and at least one processor configured to control the transmitter. The at least one processor may be configured to select at least one of control channel candidates in a BWP including one or more SBs based on a control channel SS configuration and a CORESET configuration which are associated with each other, and transmit a control channel carrying control information in the at least one control channel candidate. The at least one processor may be configured to configure each CORESET frequency resource area in each SB of the BWP based on a CORESET frequency resource area of a specific SB of the BWP. The specific SB may be limited to one SB located at a lowest frequency among the one or more SBs included in the BWP.

Each SB may correspond to a resource block (RB) set.

The specific SB may be an RB set #0 having a lowest index in the BWP.

The control channel SS configuration may include information indicating at least one SB located at a frequency in which the wireless communication device 1 is to monitor the control channel candidates among the one or more SBs included in the BWP.

The wireless communication device 1/2 may configure the same CORESET frequency resource area as the CORESET frequency resource area of the specific SB in the at least one SB indicated by the control channel SS configuration.

The wireless communication device 1 may obtain information about a CORESET frequency resource area of the RB set #0 from the CORESET configuration. The wireless communication device 2 may provide information about a CORESET frequency resource area of RB set #0 by the CORESET configuration.

The information about the CORESET frequency resource area of RB set #0 may be applied commonly to each RB set for monitoring the control channels candidates.

The wireless communication device 1 may obtain information about the CORESET frequency resource area of the specific SB from a bitmap indicating CORESET frequency-domain resources included in the CORESET configuration.

Each CORESET frequency resource area configured in each SB of the BWP may be related to a same one CORESET index.

The wireless communication device 1/2 may apply same antenna port quasi co-location (QCL) information to each CORESET frequency resource area configured in each SB of the BWP.

The wireless communication device 1 may wake up and monitor the control channel candidates during an On Duration of a discontinuous reception (DRX) cycle.

The wireless communication device 1 may be a user equipment (UE) configured to operate in a 3rd generation partnership project (3GPP)-based wireless communication system. The wireless communication device 2 may be a base station (BS) configured to operate in a 3GPP-based wireless communication system.

The control information may be downlink control information (DCI).

The control channel may be a physical downlink control channel (PDCCH) carrying the DCI.

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
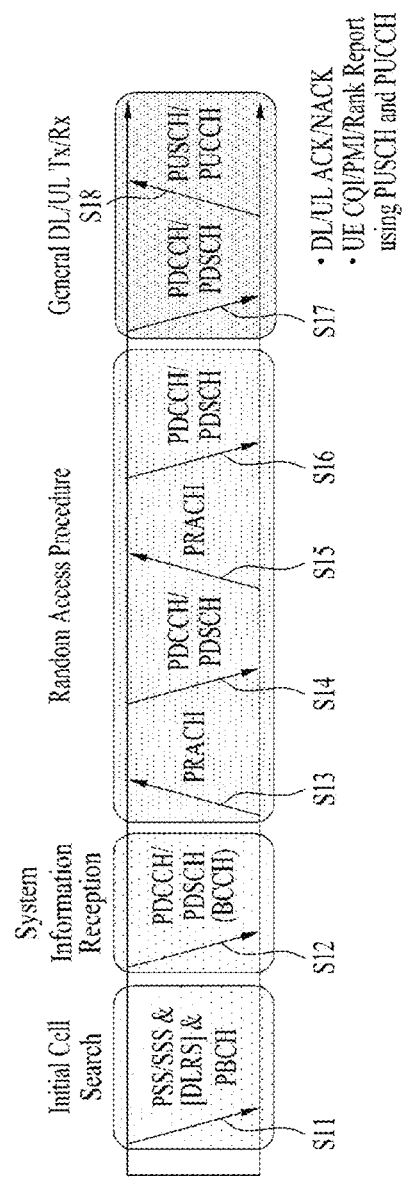
FIG. 1 illustrates physical channels used in a 3rd generation partnership project (3GPP) system as an exemplary wireless communication system, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
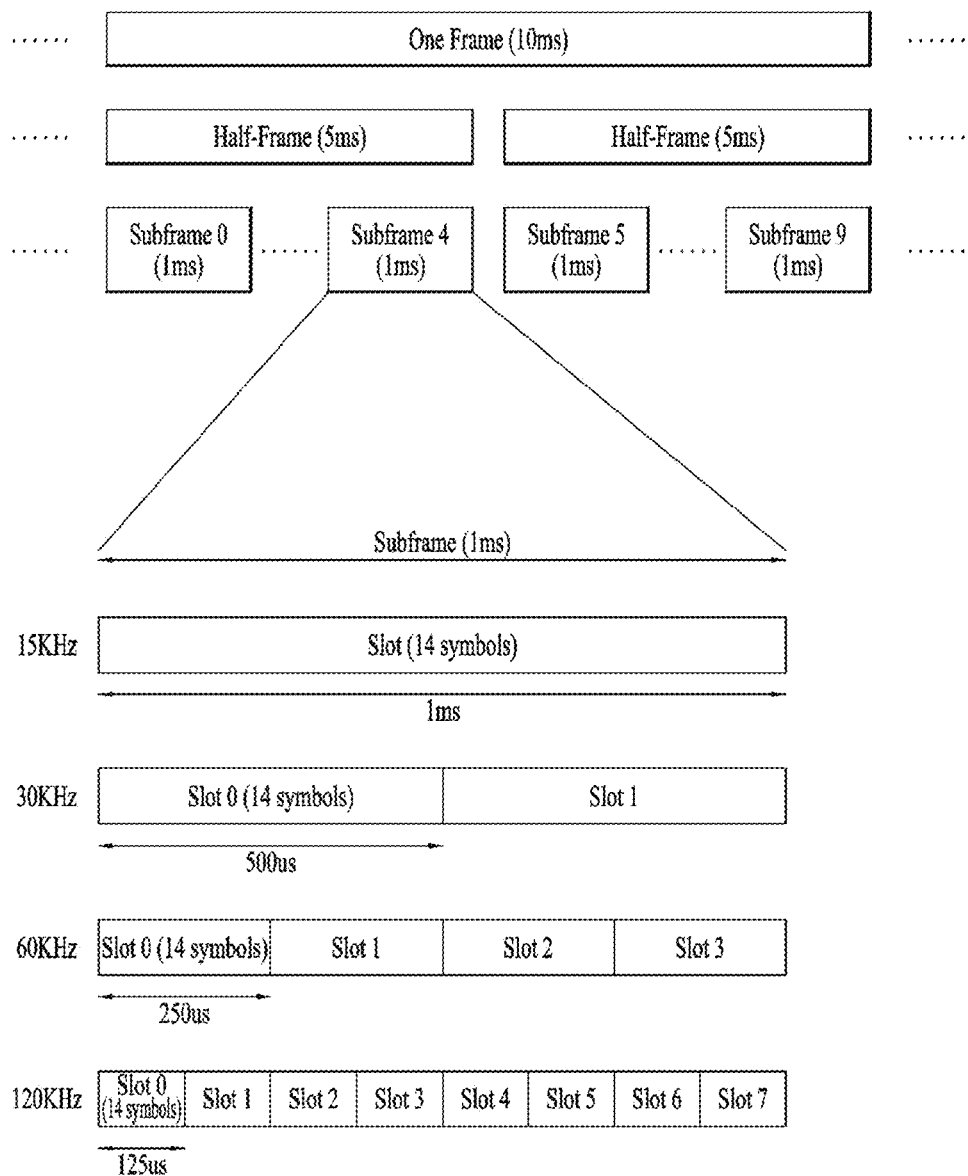
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N_{slot}^{symb}$ | $N_{frame, u}^{slot}$ | $N_{subframe, u}^{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{slot}^{symb}$: Number of symbols in a slot
* $N_{frame, u}^{slot}$: Number of slots in a frame
* $N_{subframe, u}^{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N_{slot}^{symb}$ | $N_{frame, u}^{slot}$ | $N_{subframe, u}^{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
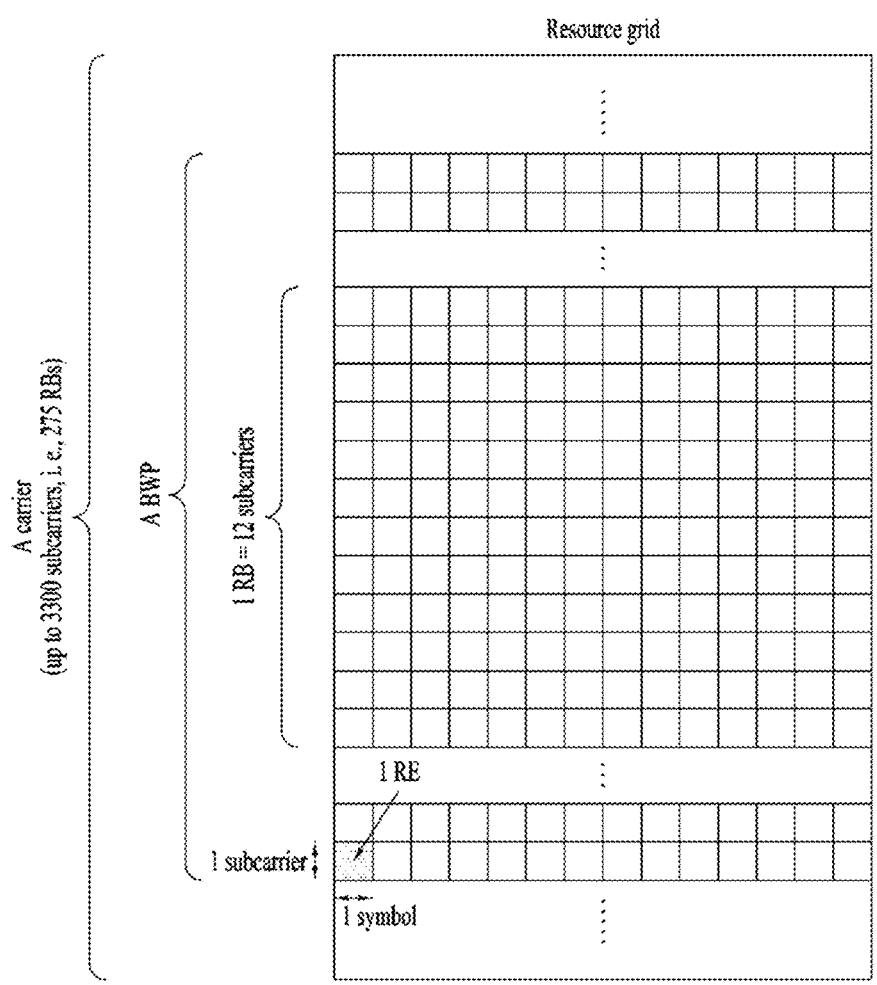
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
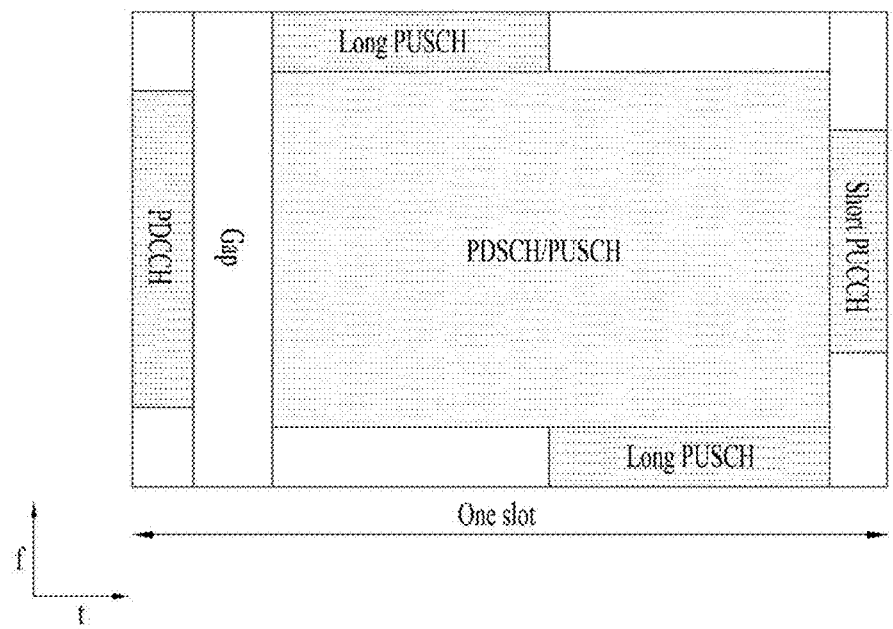
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
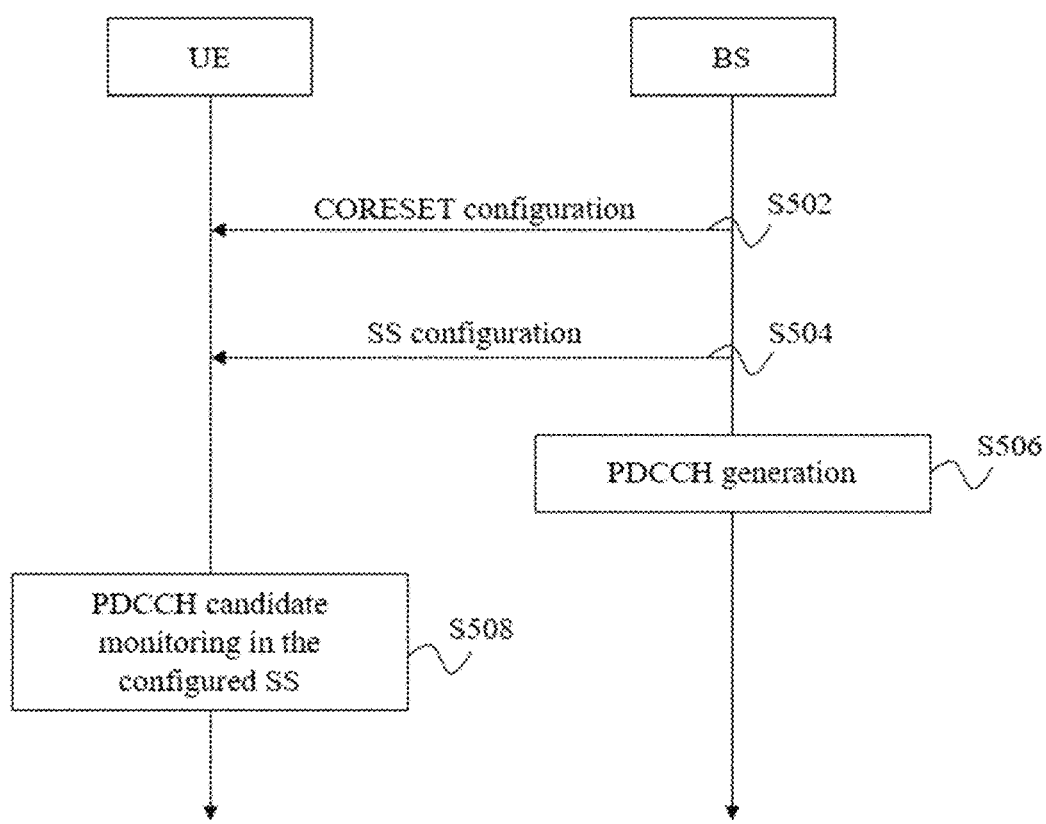
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
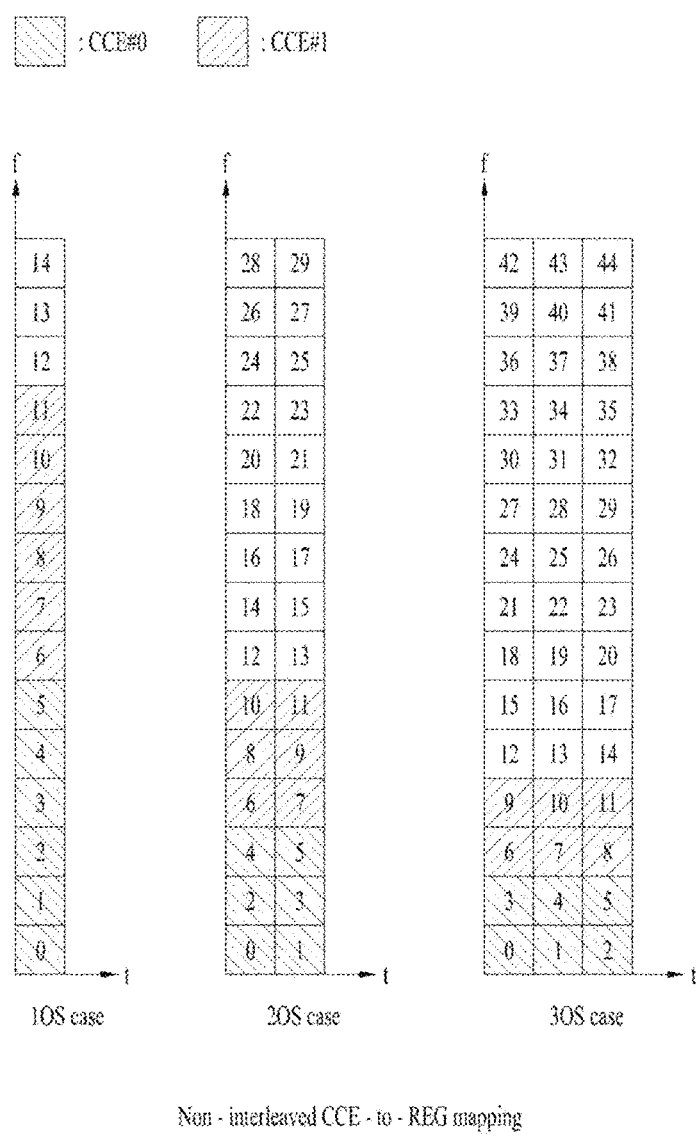
FIGS. 6 and 7 illustrate exemplary control resource set (CORESET) structures.
Figure 7:
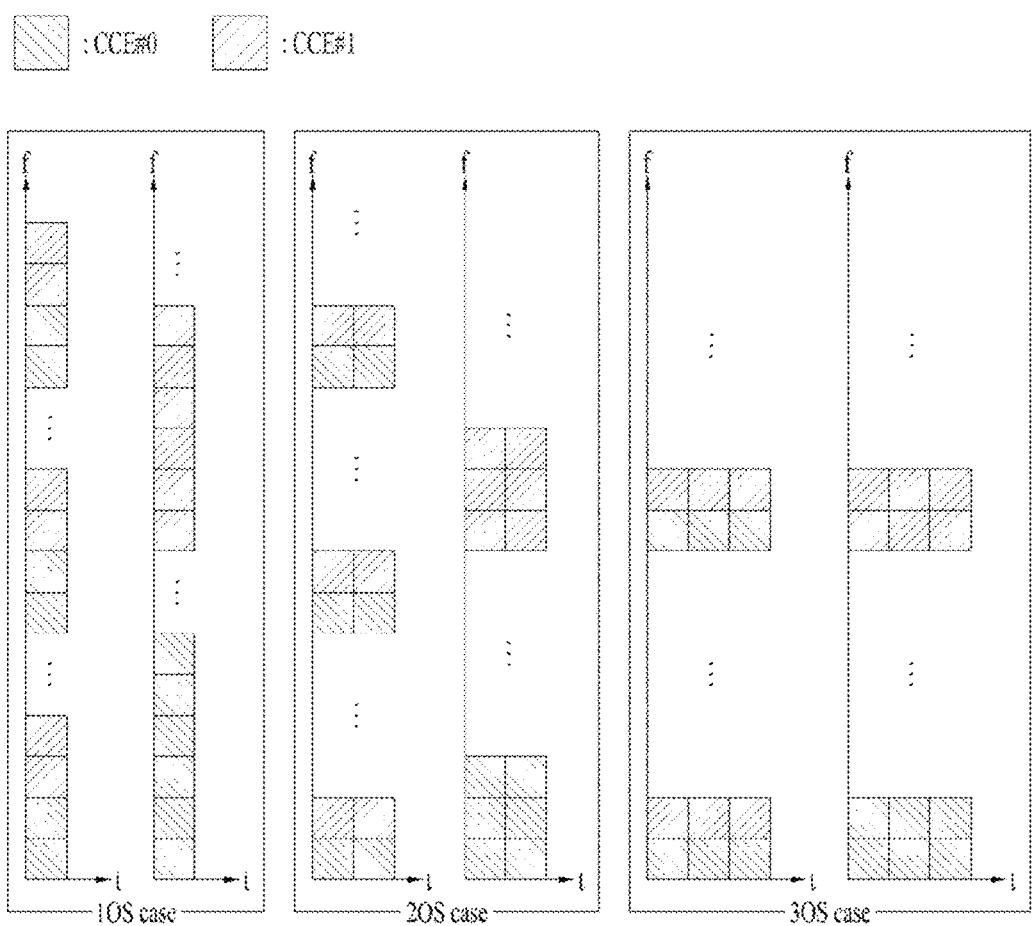

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

The 3GPP standardization organization has been working on standardization of a 5th generation (5G) wireless communication system called NR. The 3GPP NR system is designed to support a plurality of logical networks in a single physical system, and support services (e.g., eMBB, mMTC, URLLC, and so on) having various requirements by changing an OFDM numerology (e.g., an OFDM symbol duration, and an SCS). As data traffic rapidly increases along with the recent emergence of smart devices, a technique of using an unlicensed band in cellular communication is also considered for the 3GPP NR system, like licensed-assisted access (LAA) in the legacy 3GPP LTE system. Compared to LAA, however, an NR cell in an unlicensed band (hereinafter, referred to as NR UCell) is aimed at a stand-alone (SA) operation. For example, PUCCH transmission, PUSCH transmission, and so on may be supported in the NR UCell.

Figure 8:
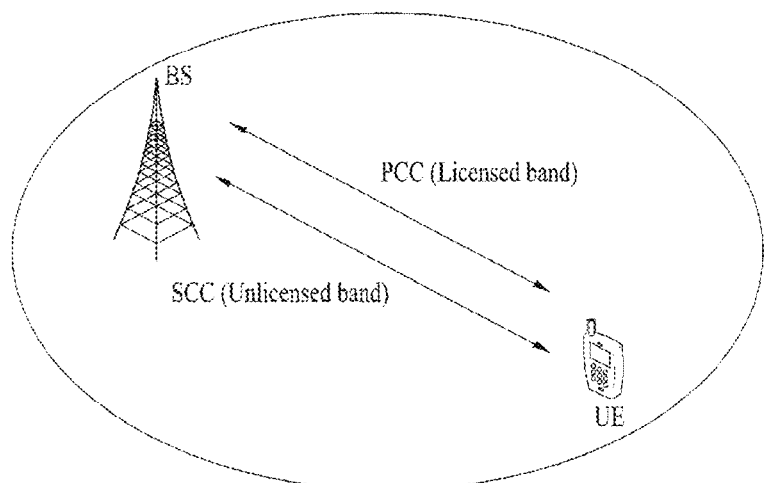
FIG. 8 illustrates exemplary wireless communication systems supporting an unlicensed band.
Figure 8:
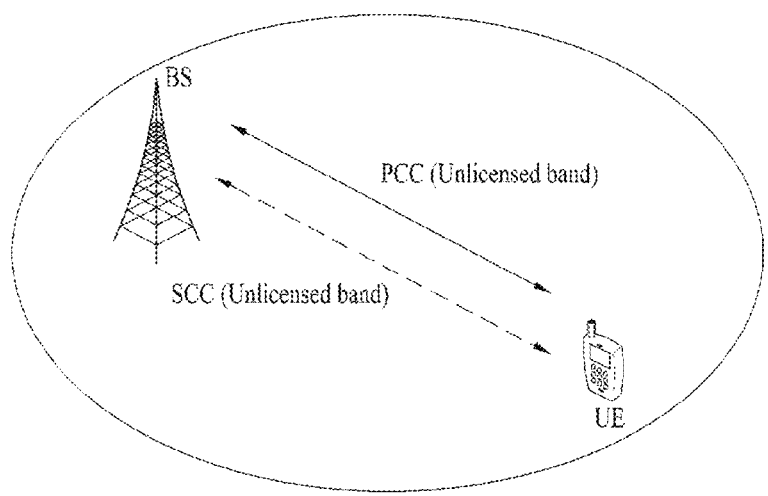

FIG. 8 illustrates a wireless communication system supporting an unlicensed band. For convenience, a cell operating in a licensed band (hereinafter, L-band) is defined as an LCell and a carrier of the LCell is defined as a (DL/UL) LCC. A cell operating in an unlicensed band (hereinafter, U-band) is defined as a UCell and a carrier of the UCell is defined as a (DL/UL) UCC. A carrier of a cell may represent an operating frequency (e.g., a center frequency) of the cell. A cell/carrier (e.g., CC) may generically be referred to as a cell.

When carrier aggregation is supported, one UE may transmit and receive signals to and from a BS in a plurality of aggregated cells/carriers. If a plurality of CCs is configured for one UE, one CC may be configured as a primary CC (PCC) and the other CCs may be configured as secondary CCs (SCCs). Specific control information/channels (e.g., a CSS PDCCH and PUCCH) may be configured to transmit and receive signals only in the PCC. Data may be transmitted and received in the PCC and/or the SCCs. In FIG. 8(a), the UE and the BS transmit and receive signals in the LCC and the UCC (non-standalone (NSA) mode). In this case, the LCC may be configured as the PCC and the UCC may be configured as the SCC. If a plurality of LCCs is configured for the UE, one specific LCC may be configured as the PCC and the other LCCs may be configured as the SCCs. FIG. 8(a) corresponds to LAA of the 3GPP LTE system. FIG. 8(b) illustrates the case in which the UE and the BS transmit and receive signals in one or more UCCs without the LCC (SA mode). In this case, one of the UCCs may be configured as the PCC and the other UCCs may be configured as the SCCs. Both the NSA mode and the SA mode may be supported in an unlicensed band of the 3GPP NR system.

Figure 9:
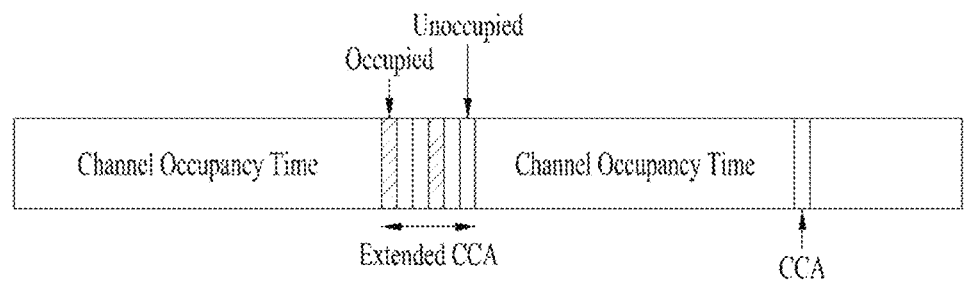
FIG. 9 illustrates an exemplary method of occupying resources in an unlicensed band.

FIG. 9 illustrates a method of occupying resources in an unlicensed band. According to regional regulations concerning the unlicensed band, a communication node in the unlicensed band needs to determine, before signal transmission, whether other communication nodes use a channel. Specifically, the communication node may first perform carrier sensing (CS) before signal transmission to check whether other communication nodes transmit signals. If it is determined that other communication nodes do not transmit signals, this means that clear channel assessment (CCA) is confirmed. When there is a predefined CCA threshold or a CCA threshold configured by higher layer (e.g., RRC) signaling, if energy higher than the CCA threshold is detected in a channel, the communication node may determine that the channel is in a busy state and, otherwise, the communication node may determine that the channel is in an idle state. For reference, in Wi-Fi standard (802.11ac), the CCA threshold is set to −62 dBm for a non-Wi-Fi signal and to −82 dBm for a Wi-Fi signal. Upon determining that the channel is in an idle state, the communication node may start to transmit signals in the UCell. The above processes may be referred to as listen-before-talk (LBT) or a channel access procedure (CAP). LBT and CAP may be used interchangeably.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set q∈{4, 5, . . . , 32} and then perform CCA for one CCA slot. When the channel is unoccupied in the first CCA slot, the communication node may secure a time period of up to (13/32)q ms and transmit data in the time period. When the channel is occupied in the first CCA slot, the communication node randomly selects N∈{1, 2, . . . , q}, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32)q ms and transmit data.

Embodiments: Transmission and Reception of Control Channel in NR-U

In an NR U-band situation, one CC/cell and/or BWP may be configured for a UE as a wideband (WB) CC and/or BWP having a larger bandwidth (BW) than in legacy LTE (LAA). However, a BW requiring CCA based on an independent LBT operation may be limited even in the WB CC/BWP (according to a specific regulation). In this context, when an individual unit subband for which LBT is performed is defined as an LBT-subband (LBT-SB), one WB CC/BWP may include a plurality of LBT-SBs. LBT-SB may be referred to shortly as SB. For example, one WB CC may be divided into one or more BWPs, and one BWP may be divided into one or more SBs. LBT may be performed on an SB basis.

Figure 10:
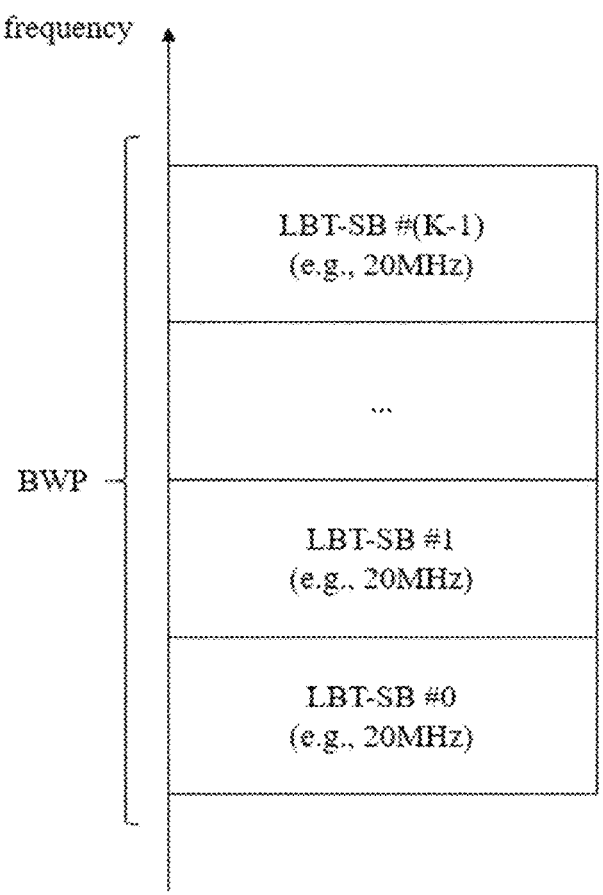
FIGS. 10 and 11 illustrate exemplary bandwidth part (BWP) structures.
Figure 11:
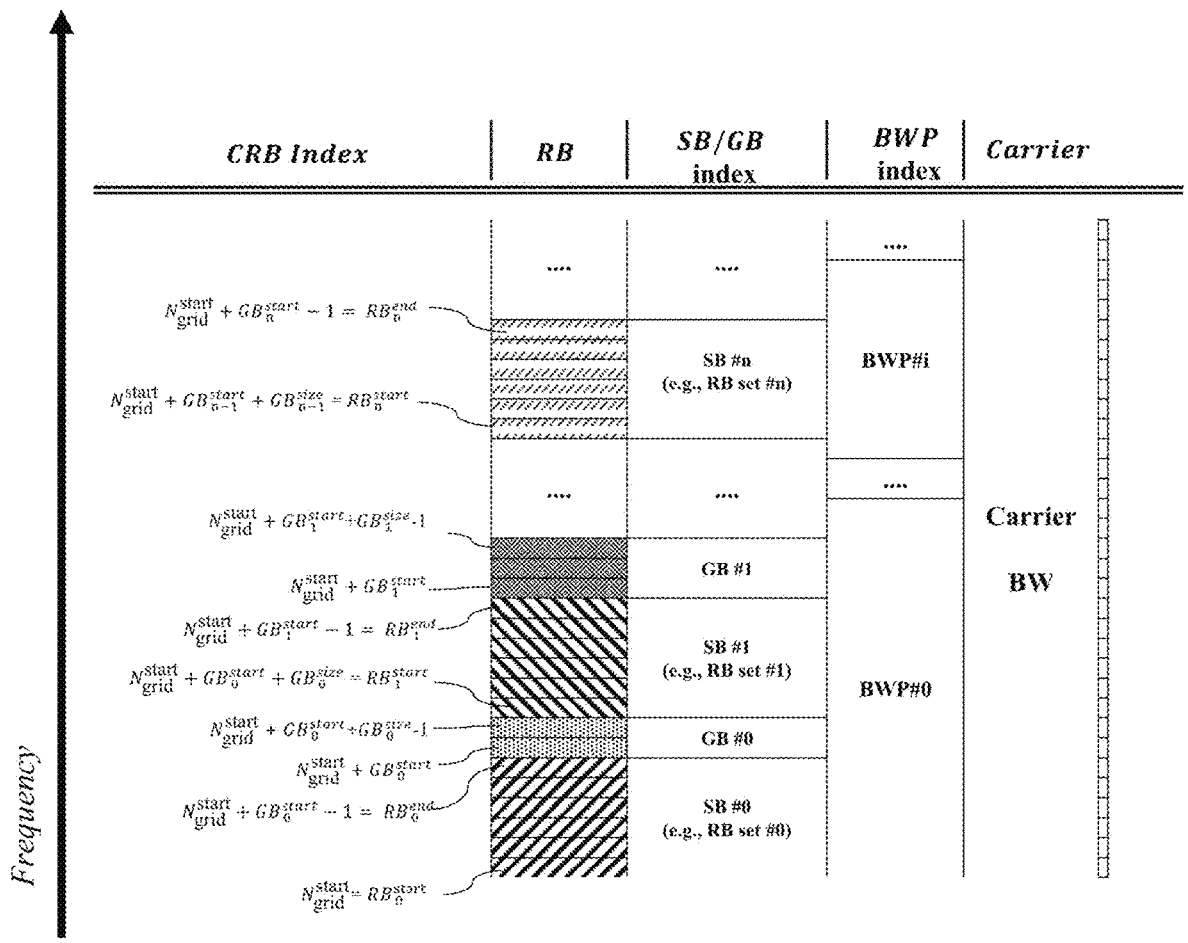

FIG. 10 illustrates an exemplary BWP including a plurality of LBT-SBs. FIG. 11 illustrates BWPs and SBs included in a carrier (e.g., WB CC). FIGS. 10 and 11 are provided to help understanding of the description, not limiting the scope of the present disclosure.

An LBT-SB may have a bandwidth of, for example, (approximately) 20 MHz. For example, one BWP may be divided into one or more SBs, each being equal to or less than 20 MHz. The number of RBs and the number of subcarriers in an SB may vary depending on an SCS.

As illustrated in FIG. 11, an SB may be represented as a set of RBs. For example, SB #i may be expressed as RB-SET #i. While not shown in FIG. 10 for convenience, a guard band (GB) may be provided between adjacent SBs as illustrated in FIG. 11. For example, for a total of K SBs in a BWP, (K−1) GBs may be configured in the BWP. The index of the first available CRB may be "$N_{grid}^{start}$". "$N_{grid}^{start}$" may be a parameter "offsetToCarrier" indicated by higher-layer signaling. The parameter "offsetToCarrier" may indicate the number of RBs as a frequency offset between the first subcarrier and the first available CRB in CRB #0. In general, SB #n resides after GB #n−1, The starting CRB index of SB #n is given by "$RB_n^{start} = N_{grid}^{start} + GB_{n-1}^{start} + GB_{n-1}^{size}$" and the ending CRB index of SB #n is given by "$RB_n^{end} = N_{grid}^{start} + GB_{n-1}^{start} - 1$". "$GB_i^{start}$" may represent the starting CRB index of GB #i, and "$GB_i^{size}$" may represent the frequency-domain size of GB #i in CRBs (e.g., the number of CRBs included in GB #i). The starting CRB index of GB #i, "$GB_i^{start}$" and/or the frequency-domain size of GB #i, "$GB_i^{size}$" may be parameters indicated by higher-layer signaling (e.g., RRC signaling). The starting/ending CRB index and frequency-domain size of each SB/GB illustrated in FIG. 11 are exemplary, and the present disclosure may be applied to various other modification examples.

In the above situation, when a BS passes LBT (the resulting CCA) for a DL transmission only in a part of a plurality of LBT-SBs within a WB-CC/BWP, while failing in LBT in the other LBT-SBs, the DL transmission from the BS and reception of the DL transmission at the UE may have to be performed only in the LBT-pass-SBs.

The present disclosure proposes a PDCCH transmission/reception method, when a WB-CC and/or BWP including a plurality of LBT-SBs is configured. For example, a PDCCH SS (e.g., a PDCCH candidate set) configuration for which a WB-CC/BWP operation based on LBT for each individual LBT-SB is considered and/or a method of monitoring a PDCCH (e.g., performing PDCCH blind decoding (BD) based on the PDCCH SS configuration by a UE are proposed. Before a description of the proposals, assumptions/terms related to the inclusion relationship between a WB-CC/BWP and an LBT-SB and the PDCCH BD capability of a UE are described below. In the present disclosure, "X/Y" may be replaced with a ceiling function, ceil(X/Y) or a flooring function, floor(X/Y).

K: the number of LBT-SBs included in one BWP (e.g., WB-CC/BWP).

N_max: the maximum number of PDCCH BDs that the UE is capable of performing in a single slot on a single CC/BWP.

CORSET: a time/frequency resource area (having a specific time period) in which one or more PDCCH SSs may be configured/transmitted/detected.

CORESET configuration: it includes parameters required for configuring/defining a CORSET. For a CORSET configuration, see the description of FIG. 5, and for more details, see "ControlResourceSet information element" in 3GPP TS 38.331 Rel-15/16.

SS configuration: it includes parameters required for configuring/defining an SS. For an SS configuration, see the description of FIG. 5, and for more details, see "SearchSpace information element" in 3GPP TS 38.331 Rel-15/16.

LBT-BW: a unit BW (e.g., 20 MHz) (or an equivalent number/set of RBs) requiring individual/independent LBT or a BW (or an equivalent number/set of RBs) except a GB in the unit BW. As described before, LBT-BW may be interchangeably used with a subband (SB), a narrowband (NB), LBT-SB, and LBT-NB in the same meaning.

LBT-pass-SB: an LBT-SB for which CCA is successful through LBT or an LBT-SB available for a signal transmission and reception operation.

LBT-fail-SB: an LBT-SB for which CCA is failed through LBT or an LBT-SB unavailable for a signal transmission and reception operation.

Allocation/execution of BD for specific X PDCCH candidates (or allocation/execution of specific X BDs (BD candidates): this may mean that the X PDCCH candidates are a maximum number of available/valid BD targets. The number of PDCCH candidates for which the UE actually performs a BD operation may be set to a value equal to or less than X through comparison with the maximum number of PDCCH BDs that the UE is capable of performing in a single slot on a single CC/BWP.

CC or BWP (RB sets/RB indexes in a corresponding BW): a (virtual) BW (RB sets/indexes in the corresponding BW) configured/defined with respect to a specific frequency location, reference point A configured by higher-layer signaling, as described before. Point A may be subcarrier #0 in CRB #0.

The proposed methods of the present disclosure may also be applied to a channel estimation (CE) process (e.g., a DMRS-based CE operation for a unit resource (e.g., CCE) used for PDCCH transmission) at a UE. For example, in the case of CE processing (a maximum number of CE processes) that the UE is capable of in a single slot on a single CC/BWP, a similar principle/operation may be applied by replacing the number of PDCCH BDs (PDCCH BD candidates) with the number of CCEs subject to CE (e.g., for PDCCH detection/reception in each LBT-SB or LBT-pass-SB).

In the following description, a PDCCH (and/or SS) may be limited to mean only a PDCCH carrying UE-specific DCI (and/or a USS for DCI configuration/transmission). For example, the proposed methods may be applied, excluding a PDCCH carrying UE (group)—common DCI (and/or a CSS for DCI configuration/transmission) and (the number of) BDs for the PDCCH. Alternatively, a PDCCH (and/or SS) may mean any PDCCH (and/or SS) except for a specific PDCCH (hereinafter, referred to as a special PDCCH) carrying information about the position/index of an LBT-pass-SB (and/or an SS for corresponding DCI configuration/transmission). Accordingly, the proposed methods may be applied, excluding the special PDCCH (and/or SS) and (the number of) BDs for the special PDCCH.

While distinction is made between the proposed methods, for clarity of description, each of the proposals does not necessarily constitute an independent invention. Unless contradicting each other, the proposals may be referenced to each other, and some proposals may be implemented as one invention.

(1) Proposal 1

For K LBT-SBs included in one WB-CC/BWP, a CORESET may be configured for each individual LBT-SB, or one CORESET may be configured over a plurality of LBT-SBs. The plurality of LBT-SBs over which the CORESET(s) is configured are not necessarily limited to the K LBT-SBs, and the CORSET(s) may be configured in M LBT-SBs among the K LBT-SBs, where M is a positive integer less than or equal to K. A PDCCH SS may be set/configured in each LBT-SB based on the CORESET(s) in the following manner.

1) Opt 1: (One) PDCCH SS may be configured based on N PDCCH candidates per LBT-SB. N may be set to a value equal to or less than N_max. The same or different N values may be set for a plurality of LBT-SBs.

2) Opt 2: K' PDCCH SSs may be configured based on N' PDCCH candidates per LBT-SB. The same or different N' values may be set for a plurality of SSs, and the sum of values N' across the K' SSs may be equal to or less than N_max. For example, N'=N_max/K or N'=N_max/K'. K' may be equal to or different from K.

In this situation, the UE may perform a PDCCH BD (monitoring) operation according to the result of LBT for the WB-CC/BWP (the K LBT-SBs included in the WB-CC/BWP) as follows.

In a slot before the UE identifies the positions/indexes of LBT-pass-SBs for which LBT is successful in the WB-CC/BWP by a specific signal/signaling, the UE may perform PDCCH BD (hereinafter, referred to as default BD) in the following manner.

A. In Opt 1, the UE may perform BD only for specific Na PDCCH candidates (e.g., having the lowest indexes) (Na<N, for example, Na=N/K or Na=N_max/K) among the N PDCCH candidates configured in the PDCCH SS of each LBT-SB. The sum of values Na across the LBT-SBs may be equal to or less than N or N_max, where a value Na is set/determined for each LBT-SB.

B. In Opt 2, the UE may perform BD only for one specific PDCCH SS (e.g., having the lowest index) among the K' PDCCH SSs of each LBT-SB. For example, the UE may perform BD only for the N' candidates of the PDCCH SS or Na PDCCH candidates (having the lowest indexes) (e.g., Na=N_max/K or Na=N_max/K') configured in the PDCCH SS. The sum of values Na across the LBT-SBs may be equal to or less than N_max, where a value Na is set/determined for each LBT-SB.

2) In a slot after the UE identifies the positions/indexes of the LBT-pass-SBs for which LBT is successful in the WB-CC/BWP by the specific signal/signaling, the UE may perform PDCCH BD in the following methods. For example, the UE (or BS) may identify (acquire/determine) the position/index of an available SB (e.g., the frequency location of an LBT-pass-SB) and transmit/receive a UL/DL signal in the available SB. The specific signal/signaling may be, for example, (UE-common) DCI/PDCCH indicating an available SB (based on an LBT result).

A. Case 1: When all of the K LBT-SBs are LBT-pass-SBs,
  i. the default BD operation may be performed.
B. Case 2: When only L (K>L>=1) ones of the K LBT SBs are LBT-pass-SBs,
  i. In Opt 1, BD may be performed for specific Nb (Nb<=N, for example, Nb=N/L or Nb=N_max/L) PDCCH candidates (e.g., having the lowest indexes) among the N PDCCH candidates (included in a PDCCH SS) in each LBT-pass-SB. Nb may be set/determined in inverse proportion to L and may be set to a value equal to or larger than Na. The sum of values Nb across the LBT-pass-SBs may be equal to or less than N or N_Max, where a value Nb is set/determined for each LBT-pass-SB.
  ii. In Opt 2, for each LBT-pass-SB, BD may be performed for Ka specific (Ka<=K', for example, Ka=K'/L or Ka=K/L) PDCCH SSs (e.g., having the lowest indexes) among the K' PDCCH SSs of the LBT-pass-SB. For example, BD may be performed for all of the PDCCH candidates configured in each of the corresponding SSs or some (e.g., PDCCH candidate(s) having the lowest index(s)) of the PDCCH candidates.
C. In another method, when L is less than a specific value, the UE may apply the operation of Case 2, whereas when L is equal to or larger than the specific value, the UE may perform the default BD operation for each individual LBT-pass-SB.

The proposals may be generalized to the following PDCCH BD methods of the UE, when each of K LBT-SBs included in one WB-BWP is configured with N PDCCH candidates (N may be equal or different for the K LBT-SBs) and L LBT-SBs out of the K LBT-SBs are LBT-pass-SBs.
  1) When K>=L>1, the UE may perform BD only for specific Np (<N) PDCCH candidates (e.g., having the lowest indexes) configured in each of the LBT-pass-SBs. As L increases, Np decreases, and as L decreases, Np increases. The UE may skip BD for LBT-fail-SBs (the PDCCH candidates configured in the LBT-fail-SBs).
  2) When L=1, the UE may perform BD for the N PDCCH candidates configured in the single LBT-pass-SB. The UE may skip BD for LBT-fail-SBs (the PDCCH candidates configured in the LBT-fail-SBs).

In another method, in the case where N PDCCH candidates are configured in each of K LBT-SBs included in a single WB BWP (N is equal or different for the K LBT-SBs), when L LBT-SBs out of the K LBT-SBs are LBT-pass-SBs, the UE may perform PDCCH BD in the following methods.
  When K>=L>=1, the UE may perform BD for the N PDCCH candidates configured in each of the LBT-pass-SBs. The UE may skip BD for LBT-fail-SBs (the PDCCH candidates configured in the LBT-fail-SBs).

(2) Proposal 2

For K LBT-SBs included in one WB-CC/BWP, a CORESET may be configured for each individual LBT-SB, or one CORESET may be configured over a plurality of LBT-SBs. The plurality of LBT-SBs over which the CORESET(s) is configured are not necessarily limited to the K LBT-SBs, and the CORSET(s) may be configured in M LBT-SBs among the K LBT-SBs, where M is a positive integer less than or equal to K. A PDCCH SS may be set/configured in each LBT-SB based on the CORESET(s) in the following manner.
  1) Opt 1: (One) PDCCH SS may be configured based on N PDCCH candidates per LBT-SB. N may be set to a value equal to or less than N_max. The same or different N values may be set for a plurality of LBT-SBs.
  2) Opt 2: K' PDCCH SSs may be configured based on N' PDCCH candidates per LBT-SB. The same or different N' values may be set for a plurality of SSs, and the sum of values N' across the K' SSs may be equal to or less than N_max. For example, N'=N_max/K or N'=N_max/K'. K' may be equal to or different from K.

In this situation, the UE may perform a PDCCH BD (monitoring) operation according to the result of LBT for the WB-CC/BWP (the K LBT-SBs included in the WB-CC/BWP) as follows.
  1) (Operation 1: the frequency location/index of an SB is identified): Before a PDCCH BD (monitoring) operation, the UE may identify the positions/indexes of LBT-pass-SBs for which LBT is successful in the WB-CC/BWP by a specific signal/signaling or by PDCCH DMRS detection. For example, the UE (or BS) may identify (acquire/determine) the position/index (e.g., the frequency location) of an available SB and transmit/receive a UL/DL signal in the available SB. The specific signal/signaling may be, for example, (UE-common) DCI/PDCCH indicating an available SB (based on an LBT result).
    A. For example, the UE may not perform PDCCH BD (monitoring) until before identifying the positions/indexes of the LBT-pass-SBs in the WB-CC/BWP.
    B. However, when the specific signal/signaling is in a specific PDCCH (hereinafter, referred to as special PDCCH) format, the special PDCCH (and an SS configured for configuration/transmission of the special PDCCH) may be excluded (exceptionally) from the operation of not performing PDCCH BD, described in 'A'.
  2) (Operation 2: PDCCH BD/monitoring): After identifying the positions/indexes of the LBT-pass-SBs by the specific signal/signaling or by PDCCH DMRS detection, the UE may perform PDCCH BD in the following manner (or the BS may map/transmit a PDCCH).
    A. The selection priority levels of the K LBT-SBs (or the (relative) indexes of the K LBT-SBs) may be preconfigured for the UE (e.g., by RRC signaling or the like).
    B. When L (K>=L>=1) ones of the K LBT-SBs are LBT-pass-SBs, only one LBT-pass-SB with the highest priority level (or with a specific (e.g., lowest) LBT-SB index) may be selected from among the L LBT-pass-SBs. The UE may perform PDCCH BD for the total N PDCCH candidates set/configured in the selected LBT-pass-SB (in Opt 1) or only for the K' SSs (each including N' PDCCH candidates) set/configured in the selected LBT-pass-SB (in Opt 2).
    C. In another method, when L<K, the UE may operate as described in 'B', whereas when L=K, the UE may perform the default BD operation for each individual LBT-pass-SB.

The proposals may be generalized to the following PDCCH BD methods of the UE, when each of K LBT-SBs included in one WB-BWP is configured with N PDCCH candidates (N may be equal or different for the K LBT-SBs) and L LBT-SBs out of the K LBT-SBs are LBT-pass-SBs.
  When K>=L>=1, the UE may perform BD only for the N PDCCH candidates configured in one specific one of the L LBT-pass-SBs (e.g., an LBT-pass-SB having the lowest index or the highest priority level (among the preconfigured selection priority levels of the LBT-SBs)). In this case, the UE may skip BD for (the PDCCH candidates configured in) the remaining LBT-pass-SBs and LBT-fail-SBs.

(3) Proposal 3

The following options (Opts) may be considered to configure a CORESET in which (a set of PDCCH BD candidates corresponding to) each PDCCH SS is transmitted/configured/associated. Distinction is made between the methods/options to describe various aspect of the present disclosure, and unless contradicting each other, the methods/options labeled with different indexes may be used in combination.

1) Opt 1: One WB CORESET (or one WB CORSET index or ID) may be configured for one PDCCH SS. For example, one PDCCH SS configuration (one SS index or ID) may be associated with one WB CORESET configuration (or one WB CORSET index or ID). Accordingly, only one monitoring occasion/location for one PDCCH SS in the frequency domain may be provided in a BWP. A plurality of PDCCH SS configurations each being associated with a WB CORSET may be provided to the UE. In this case, one or more WB CORESET configurations may be provided in one BWP. For example, one WB CORESET may be associated with one or more PDCCH SS configurations.

Figure 12:
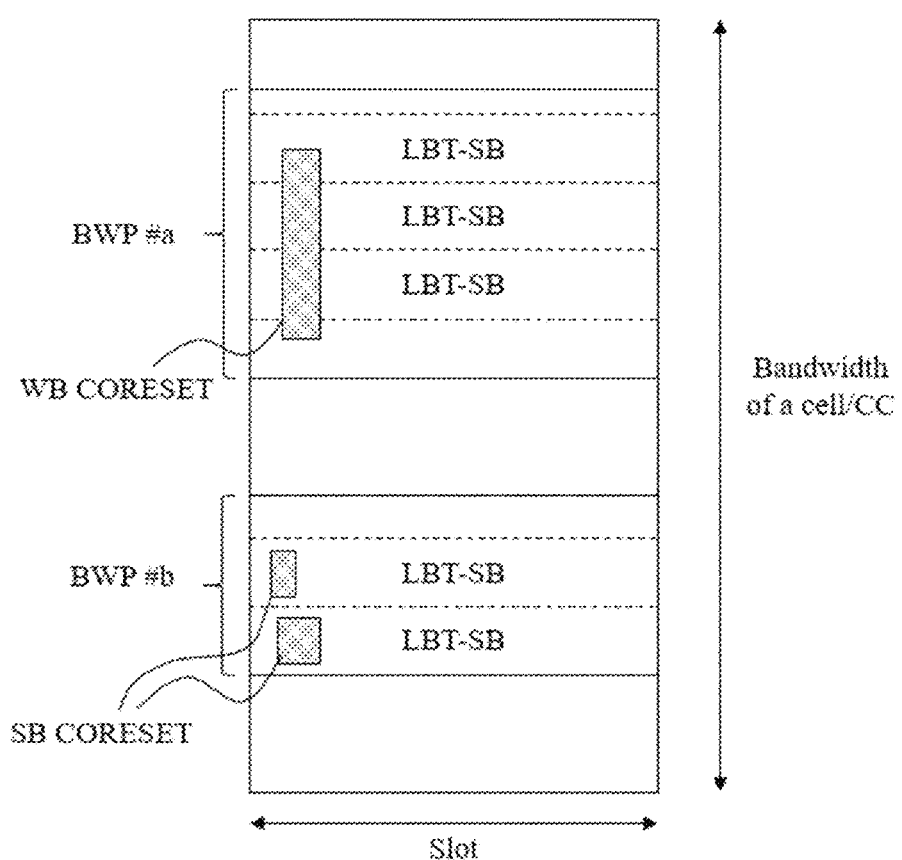
FIGS. 12 to 15 illustrate control resource set (CORSET) configurations according to an example of the present disclosure.

A. A WB CORESET may be configured as a frequency area including a plurality of LBT-SBs. In FIG. 12, BWP #a is an exemplary BWP in which a WB CORESET is configured. When BWP #a includes K LBT-SBs, the WB CORSET is not necessarily configured across all of the K LBT-SBs. Rather, the WB CORSET may be configured over M ones of the K LBT-SBs where M is a positive integer less than or equal to K. The M LBT-SBs may be spaced from each other, not necessarily consecutive in the frequency domain. While a guard band (GB) described before with reference to FIG. 11 is not shown in BWP #a in FIG. 12, at least one GB may be located between the start and end of the WB CORESET because the WB CORSET is configured across a plurality of LBT-SBs.

2) Opt 2: One SB CORESET (or one SB CORSET index or ID) may be configured for one PDCCH SS. For example, one PDCCH SS configuration (or one PDCCH SS index or ID) may be associated with one SB CORESET configuration (or one SB CORSET index or ID). Accordingly, only one monitoring location for one PDCCH SS in the frequency domain may be provided in an LBT-SB.

A. An SB CORESET may be configured as a frequency area confined to one LBT-SB. In FIG. 12, BWP #b is a BWP in which SB CORESETs are configured. In the present disclosure, the term SB CORESET is interchangeably used with NB CORESET.

B. A different SB CORESET may be configured for each of a plurality of PDCCH SSs.

3) Opt 3: A plurality of CORESETs (or CORESET indexes or IDs) may be configured for one PDCCH SS. For example, one PDCCH SS configuration (or one PDCCH SS index or ID) may be associated with a plurality of CORESET configurations (or CORESET indexes or IDs). For example, a plurality of monitoring occasions/locations for one PDCCH SS in the frequency domain may be provided in a BWP.

A. The plurality of CORESETs may be configured in the form of a plurality of SB CORESETs. For example, a plurality of SB CORSETs may be associated with one PDCCH SS. For example, a plurality of monitoring occasions/locations for one PDCCH SS in the frequency domain may be provided in the BWP, and each monitoring occasion/location may correspond to an SB CORESET in the corresponding LBT-SB. The actual number of monitoring occasions/locations (e.g., frequency locations) provided for one PDCCH SS in the frequency domain may be limited according to an LBT result of the BS, that is, the number of LBT-pass-SBs. For example, SB CORSETs configured in some of the SBs included in the BWP may be associated with one PDCCH SS.

B. A plurality of CORESETs (e.g., SB CORESETs) may be grouped into one CORESET group (e.g., one group of SB CORESETs). The SB CORESET group may be understood as one CORESET configured (in a larger frequency area than an SB) in the BWP. For example, with a plurality of CORESETs (e.g., SB CORESETs) grouped into one CORESET group (e.g., one group of SB CORESETs), one (SB) CORESET group (or one (SB) CORESET index or ID) may be configured for one PDCCH SS. For example, a plurality of CORESETs with the same index/ID (e.g., a plurality of SB CORESETs belonging to the same SB CORESET group) may be configured/associated for one PDCCH SS. When the same index/ID is assigned to a plurality of SB CORESETs (e.g., an SB CORESET group), the UE/BS may identify/consider/determine the plurality of SB CORESETs (e.g., the SB CORESET group) to be one CORESET configured in the BWP. For example, in the case where an SB CORESET of SB #m and an SB CORESET of SB #n have the same CORESET index/ID 'XY' and CORESET #'XY' is associated with a specific PDCCH SS, when the UE monitors a PDCCH based on a specific PDCCH SS configuration (or the BS transmits the PDCCH based on the specific PDCCH SS configuration), the UE may determine PDCCH candidates based on control resources (e.g., the SB CORESET) of SB #m and control resources (e.g., the SB CORESET) of SB #n, considering that CORESET #'XY' includes the control resources of SB #m and the control resources of SB #n.

i. The same parameter, for example, the same transmission configuration index (TCI) (information about an (antenna port) QCL-related source RS and a QCL type) may be configured/applied to (PDCCHs transmitted in and/or PDSCHs scheduled by) the plurality of (SB) CORESETs belonging to the same CORESET group. For details of CORESET parameters, see the description of FIG. 5 or 3GPP TS 38.331 Rel-15/16, "ControlResourceSet information element". For example, when a frequency/time resource area is allocated to an (SB) CORESET configured in one LBT-SB, an (SB) CORESET having the same frequency/time resource area may be configured in each of the plurality of LBT-SBs (in the WB BWP). The same frequency resource area may mean the same relative position and/or the same occupied bandwidth in each LBT-SB. When a CORESET (i.e., WB CORESET) is configured over a larger frequency area than a single LBT-SB, one CORESET (CORESET index or ID) may be configured for one PDCCH SS according to Opt 1.

According to Opt 3, even though SB CORESETs are configured according to an LBT-SB configuration (e.g., an SB structure to be monitored in a BWP), SB CORESETs may be configured for other SBs only based on specific SB CORESET information without the need for signaling information about an SB CORESET configuration for each individual SB.

Figure 13:
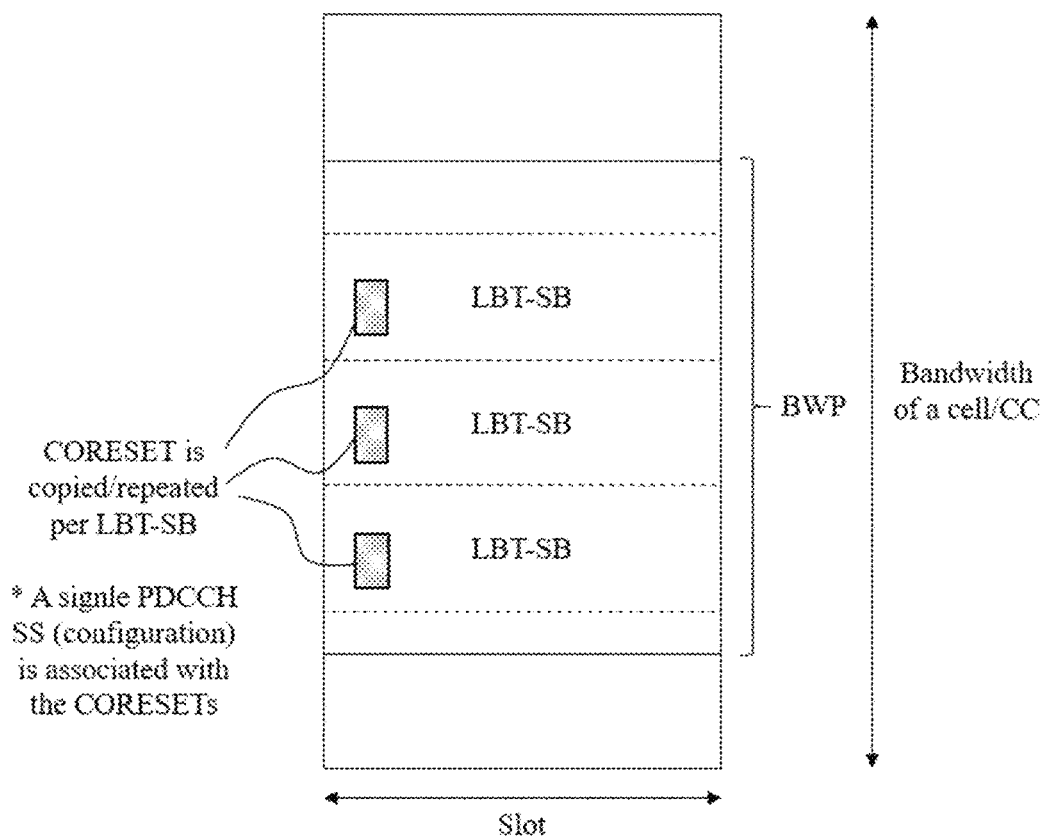

Further, according to Opt 3, even though the configuration of (monitored) LBT-SBs is partially changed, the BS/UE may reconfigure SB CORESETs simply by signaling of the LBT-SB configuration change without the need for transmitting/receiving SB CORESET configuration information each time. In a specific example, it is assumed that an SB CORESET has been configured for each of SB #1 and SB #3 at a first time. Even though the LBT-SB configuration is changed to SB #0, SB #2, and SB #4 at a second time after the first time, the BS/UE may configure SB CORESETs for SB #2 and SB #4 based on information about an SB CORESET configuration of SB #0 without the need for transmitting/receiving information about SB CORESET configurations of SB #2 and SB #4. FIG. 13 illustrates an exemplary CORESET/SS configuration according to Opt 3. Referring to FIG. 13, a BWP may include a plurality of LBT-SBs each being configured with an SB CORESET. The SB CORESETs configured in the LBT-SBs may be identical. For example, the SB CORESETs may be configured in the LBT-SBs based on the same CORESET configuration information. This configuration may be understood as applying the same CORESET parameter to the SB CORESETs, with shifts in the frequency domain. In a specific example, SB CORESETs may be configured for SB #0 and SB #1 based on the same specific CORESET configuration information. Parameters included in the specific CORESET configuration information (e.g., the number of CORESET symbols, a CORESET ID, CCE-to-RE mapping, frequency domain resources, a precoder granularity, a DMRS scrambling sequence initialization value, and/or antenna port QCL) may be used to configure an SB CORESET in SB #i as well as an SB CORESET in SB #0. However, a frequency resource-related parameter (e.g., "frequency Domain Resources") included in the specific CORESET configuration information may be reinterpreted as indicating an SB CORESET in a corresponding SB. For example, when the parameter "frequency Domain Resources" indicates the first 6 RBs as CORESET frequency resources, the parameter "frequency Domain Resources" may be interpreted as indicating the first 6 RBs of SB #0, when it is applied to SB #0. When the parameter "frequency Domain Resources" is applied to SB #i, it may be interpreted as indicating the first 6 RBs of SB #i (SB-relatively). Other frequency-related parameters included in the CORESET configuration information, for example, an RB-offset parameter may also be reinterpreted/applied relatively according to the position of an SB, like the parameter "frequency Domain Resources".

SBs configured with SB CORESETs are not necessarily contiguous. In some cases, the SBs may be spaced apart from each other. Further, SB CORESETs may be configured only in some of the SBs in a BWP. Even in this case, a plurality of SB CORESETs may be associated with the same PDCCH SS(s). For example, a plurality of monitoring occasions/locations (e.g., frequency locations) in the frequency domain are provided for one PDCCH SS, and each monitoring occasion/location may correspond to an LBT-SB. Repetition/configuration of the same SB CORESET in each LBT SB may be based on a CORESET (i.e., SB CORESET) being configured in/confined to a single LBT-SB. For example, based on a CORESET (i.e., SB CORESET) being configured in/confined to a single LBT-SB (e.g., SB #0), the same CORESET may be copied/repeated in other LBT-SBs (e.g., SB #i where 0<i) on an LBT-SB basis. On the contrary, when a CORESET is not confined to a single LBT-SB (i.e., in the case of a WB CORESET), only one CORESET (index or ID) may be configured for one PDCCH SS according to Opt 1 (see BWP #a in FIG. 12).

Figure 14:
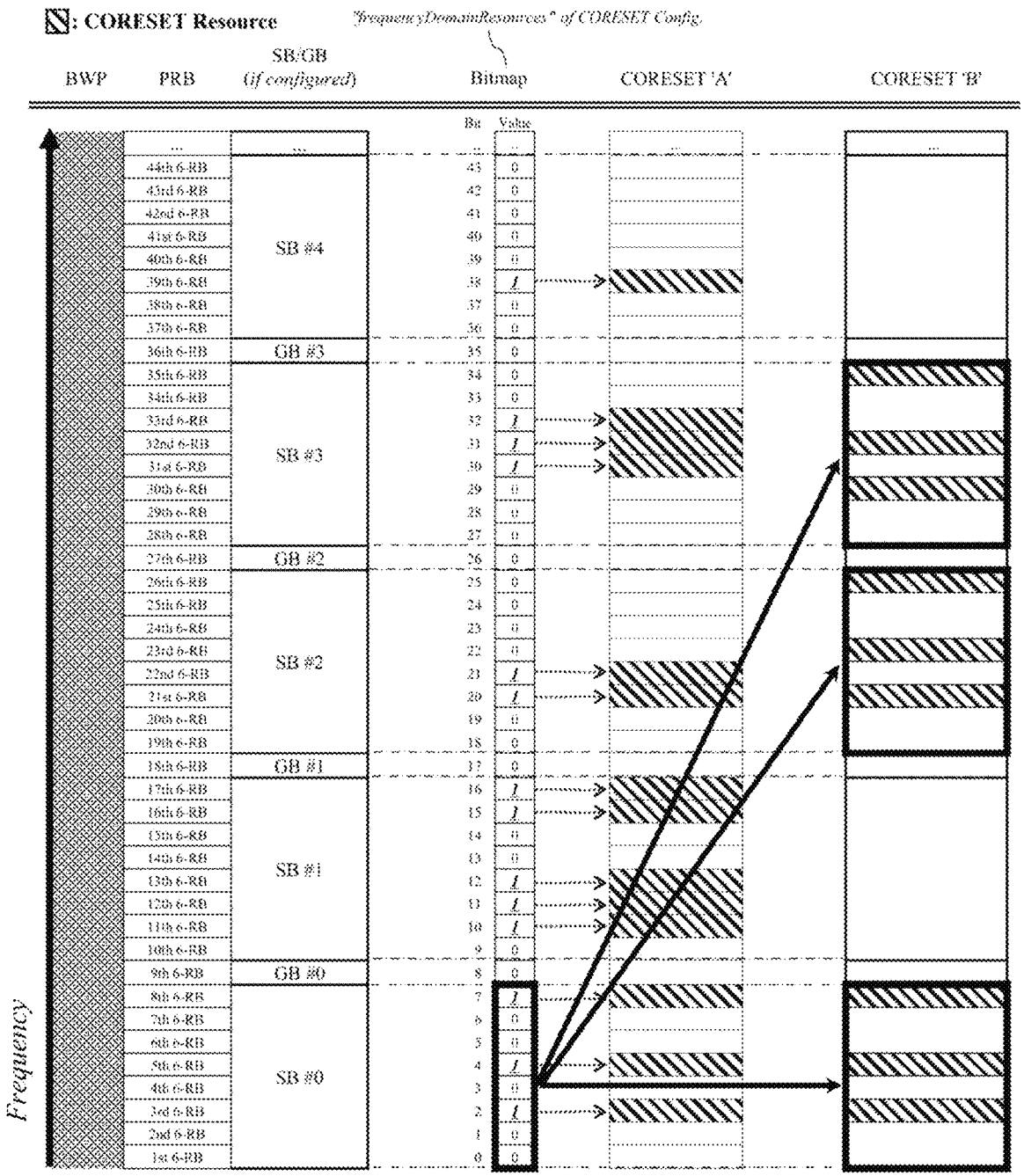

FIG. 14 illustrates a CORESET/SS configuration according to Opt 3. A minimum frequency granularity (e.g., the scale/resolution of the drawing) is 6 RBs in FIG. 14. Referring to FIG. 14, 5 SBs SB #0 to SB #4 among a plurality of SBs included in one BWP and 4 GBs GB #0 to GB #3 among a plurality of GBs are illustrated. When the present disclosure is applied, the number of SBs and the number of GBs in one BWP may vary depending on SCSs and channel environments. For convenience, it is assumed that an rb-offset for a CORESET is 0. It is also assumed that one SB includes 54 RBs (e.g., SB #0 includes 54 (available) RBs) and one GB includes 6 RBs. These assumptions should not be construed as limiting the present disclosure. In the same BWP, the SBs may have different sizes, and the GBs may have different sizes.

A bitmap illustrated in FIG. 14 represents a parameter "frequencyRomainResource" included in CORESET configuration information. As described above, each bit of the bitmap may correspond to 6 RBs. In the bitmap, 0 may indicate that corresponding 6 RBs are not frequency resources of a CORESET, and 1 may indicate that corresponding 6 RBs are frequency resources of the CORESET.

CORESET 'A' is an exemplary general CORESET configuration to which Opt 3 is not applied, whereas CORESET 'B' is an exemplary CORESET configuration to which Opt 3 is applied. As described before (e.g., proposal 1/2), when information about SB(s) in which PDCCH candidates are to be monitored (hereinafter, referred to as "monitoring SB(s)") in a corresponding BWP is provided by specific signaling (e.g., RRC signaling) (e.g., under the condition that information indicating SB(s) for PDCCH candidate monitoring is included in a PDCCH SS configuration), the UE/BS may be configured to operate according to Opt 3.

Regarding CORESET 'A', the UE/BS may configure/determine 6-RB frequencies corresponding to {2, 4, 7, 10-12, 15-16, 20-21, 30-32 and 38}th bits in the bitmap as the frequency resources of CORESET 'A' based on (i) specific signaling (e.g., RRC signaling) providing no information about monitoring SB(s) (e.g., a PDCCH SS configuration not including information indicating monitoring SB(s)) and (ii) the {2, 4, 7, 10-12, 15-16, 20-21, 30-32 and 38}th bits being set to is in the bitmap.

Regarding CORESET 'B', the UE/BS may configure/determine 6-RB frequencies corresponding to {2, 4, and 7}th bits in the bitmap in each of SB #0, SB #2, and SB #3 as the frequency resources of CORESET 'B' based on (i) specific signaling (e.g., RRC signaling) providing information about monitoring SB(s) (e.g., a PDCCH SS configuration including information indicating monitoring SB(s)) and (ii) the {2, 4, and 7}th bits among the bits corresponding to SB #0 being set to is in the bitmap. The UE/BS may apply the bits corresponding to SB #0 (e.g., Bit 0 to Bit 7 in FIG. 14) in the bitmap to each of the SBs for PDCCH monitoring. Accordingly, the same CORESET frequency resource pattern (e.g., the same SB CORESET) exists in every monitoring SB (e.g., by copying or repeating the frequency pattern). One CORESET index/ID may be assigned to CORESET 'B'. When the index/ID of CORESET 'B' is included in PDCCH SS configuration information, the UE/BS may identify/determine that a corresponding PDCCH SS is associated with CORESET 'B'.

While it is assumed that SB #0 is a monitoring SB in the example of FIG. 14, the UE/BS may apply the bits corresponding to SB #0 in the bitmap to each of the monitoring SBs, even although SB #0 is not a monitoring SB.

The UE may monitor PDCCH candidates in CORESET 'B' (based on a PDCCH SS configuration). The BS may map a PDCCH signal to at least one of the PDCCH candidates in CORESET 'B' (based on the PDCCH SS configuration) and transmit the PDCCH signal.

According to Opt 3, already acquired CORESET configuration information may be reused to configure SB CORESETs. For example, when the UE/BS has information about a first CORESET configuration for CORESET 'A', the BS may signal available SB frequency locations to the UE and associate a corresponding PDCCH SS with the information about the first CORESET configuration, so that the information about the first CORESET configuration may be reused for CORESET 'B'.

4) Note 1: A different Opt (e.g., Opt 1/3 or Opt 2) may be applied to a different SS type. A. For example, one WB CORESET may be configured for a CSS, whereas one SB CORESET may be configured for a USS.

Figure 15:
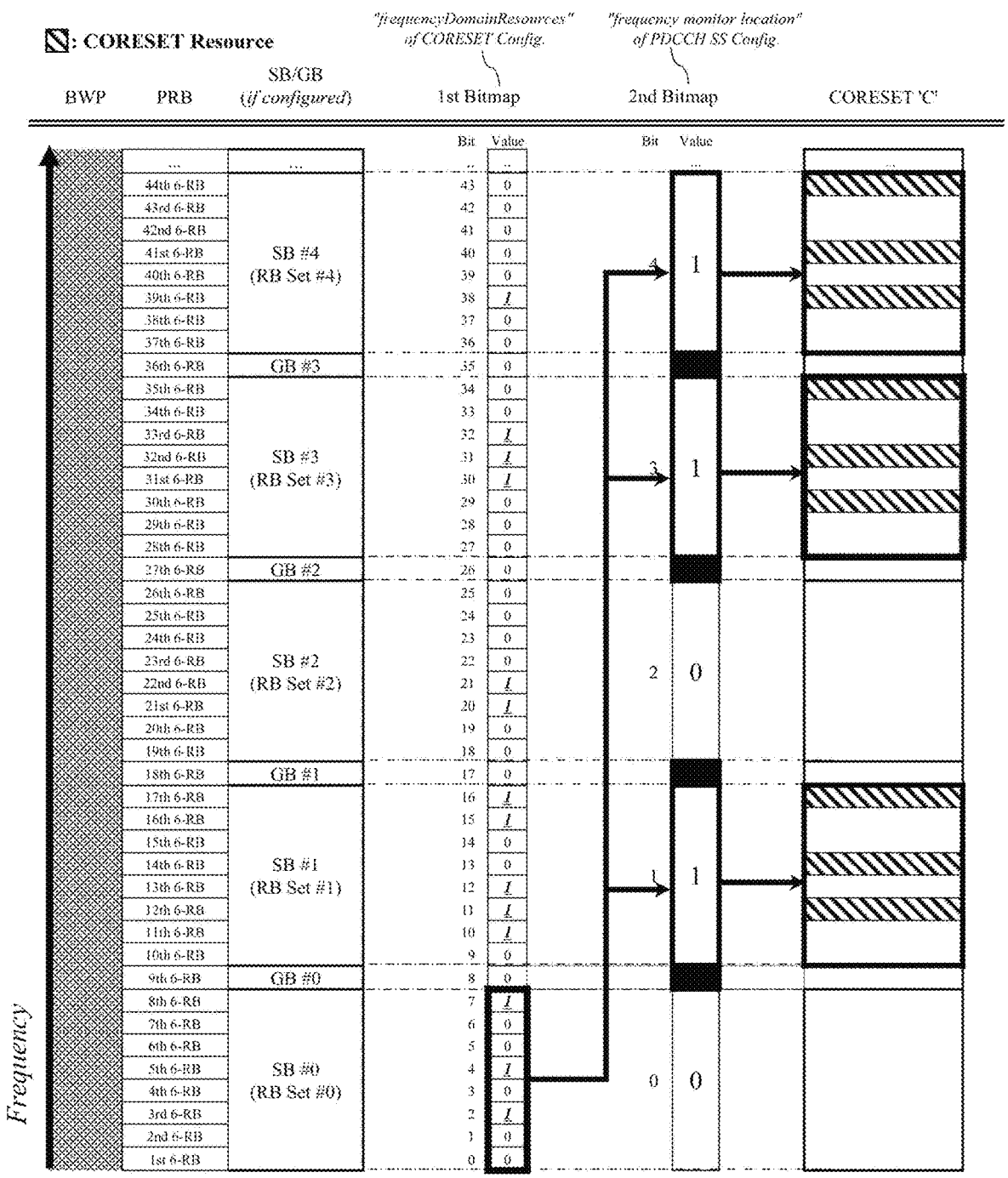

B. In another example, a plurality of SB CORESETs may be configured for a CSS and one SB CORESET may be configured for a USS, or vice versa. For example, a CORESET configuration method such as Opt 3 may be applied only to a specific SS type (e.g., USS or CSS). In a specific example, the CORESET configuration method as illustrated in FIGS. 13 to 15 (CORESET 'B' in the illustrated case of FIG. 14) may be allowed only for the USS, not for the CSS. A CORESET configured by the CORESET configuration method as illustrated in FIGS. 13 to 15 (CORESET 'B' in the illustrated case of FIG. 14) may be associated with the USS. Association between the CORESET set by the CORESET configuration method as illustrated in FIGS. 13 to 15 (CORESET 'B' in the case of FIG. 14) with the CSS may not be allowed.

5) Note 2: A different Opt (e.g., Opt 1/3 or Opt 2) may be applied to a different DCI format.

A. For example, a single WB CORESET or a plurality of SB CORESETs may be configured for DCI format X, and a single SB CORESET may be configured for the other DCI format Y (in a single SS (configuration)).

B. For example, DCI format X may be a DCI format used to signal information about the position/index of an LBT-pass-SB in a WB-CC/BWP.

For example, the CORESET configuration method such as Opt 3 may be applied only to specific DCI format(s). In a specific example, the CORESET configuration method as illustrated in FIGS. 13 to 15 (CORESET 'B' in the illustrated case of FIG. 14) may be allowed only for first DCI format(s), not for second DCI format(s). The CORESET configuration method as illustrated in FIGS. 13 to 15 (CORESET 'B' in the illustrated case of FIG. 14) may be allowed only for PDCCH (candidate) transmission/reception/blind detection based on the first DCI format(s), not for PDCCH (candidate) transmission/reception/blind detection based on the second DCI format(s).

Regarding a CORESET configuration, a rule indicating (e.g., network signaling)/identifying whether a configured CORESET is an SB CORESET belonging/included only to/in a (specific) single LBT-SB (or confined to a corresponding LBT-BW (e.g., 20 MHz)) may be required. For example, when the UE configures a CORESET based on CORESET configuration information, a rule indicating/identifying whether the UE should configure a CORESET at a WB (e.g., BWP) level or at an SB level may be required. In other words, there may be a need for a rule indicating (e.g., network signaling)/identifying whether the UE should configure a CORESET (e.g., one WB CORESET) using all of CORESET frequency-domain resource information (e.g., the parameter "frequencyDomainResource" parameter and a bitmap) included in the CORESET configuration information (e.g., all bits corresponding to a corresponding BWP) or configure a CORESET (e.g., SB CORESET(s)) using only a part (e.g., some bits related to a specific SB (or RB set) of the CORESET frequency-domain resource information (e.g., the parameter "frequencyDomainResource" parameter and the bitmap). For this purpose, the following methods may be considered.

1) Method C-1: When an RBG-wise bitmap (hereinafter, referred to as a WB-bitmap) is configured based on an RB set (the indexes of RBs in the RB set) in a CC or BWP, and only RBs belonging to/included in a specific single LBT-SB (or LBT-BW) are indicated as valid (as CORESET resources) by the WB-bitmap, the configured CORESET may correspond to an SB CORESET. For example, each bit of the WB-bitmap may correspond to an RBG in a WB and a bit value 0/1 may indicate whether the RBG is available (e.g., valid) as a CORESET resource. The location/index of the specific LBT-SB (or LBT-BW) may be preset as the lowest frequency/index in the CC or BWP.

A. For example, when a BW spanning from a (first) RB index corresponding to a first RBG (i.e., an RBG having the lowest frequency) indicated as valid (e.g., bit '1') to a (last) RB index corresponding to a last RBG (i.e., an RBG having the highest frequency) indicated as valid (e.g., bit '1') in the WB-bitmap is equal to or smaller than a single LBT-SB (or LBT-BW) (e.g., equal to or smaller than 20 MHz) and belongs to a specific LBT-SB (or LBT-BW), the configured CORESET may correspond to an SB CORESET. The location/index of the specific LBT-SB (or LBT-BW) may be preset as the lowest frequency/index in the CC or BWP.

2) Method C-2: The UE/BS may configure/apply an RBG-wise bitmap (hereinafter, referred to as an SB-bitmap) only based on an RB set (the indexes of RBs in the RB set) of a single LBT-SB (or LBT-BW), and the SB-bitmap may indicate RBs valid as CORESET resources. For example, on the assumption that CORESET frequency-domain resource information (e.g., a "frequencyDomainResource" bitmap) is used as an SB-bitmap, the UE/BS may acquire the SB-bitmap by using only bits related to a specific single SB among all bits of the "frequencyDomainResource" bitmap, and configure SB CORESET(s) from the SB-bitmap. In the afore-described example of FIG. 14, bit 0 to bit 7 of the "frequencyDomainResource" bitmap may correspond to the SB-bitmap. The UE/BS may configure SB CORESETs in SB #0, SB #2, and SB #3 by using bit 0 to bit 7 corresponding to the SB-bitmap in the "frequencyDomainResource" bitmap. Information about the locations/indexes of LBT-SBs (or LBT-BWs) (e.g., the locations of SB frequencies to be monitored by the UE) which the SB-bitmap (CORESET resources indicated by the SB-bitmap) is applied to/configured for may be indicated by the (same) CORESET configuration or a (separate) PDCCH SS configuration. For example, PDCCH SS configuration information which has been RRC-signaled to the UE in relation to PDCCH candidate monitoring of the UE may include information indicating one or more SBs to which an SB-bitmap (e.g., a bitmap indicating frequency-domain resources for configuring a CORESET) is to be applied. As such, information included in a PDCCH SS configuration, indicating SBs in which SB CORESETs are to be configured may also be represented as a bitmap. In the example of FIG. 14, for example, the BS may signal to the UE that SB CORESETs should be configured in SB #0, SB #2, and SB #3 by a PDCCH SS configuration.

It may be predefined that the location/index of an LBT-SB (or LBT-BW) which is related to an SB-bitmap (CORESET resources based on the SB-bitmap) (or to which SB-bitmap is applied/configured) is the lowest frequency or lowest index within the CC or BWP. For example, it may be predefined that the bits of the SB-bitmap are always related to SB #0. According to an embodiment in which a part of the "frequencyDomainResource" bitmap is used as an SB-bitmap, bits related to SB #0 in the "frequencyDomainResource" bitmap may be used as the SB-bitmap. However, an SB CORESET configured based on the SB-bitmap is not limited to SB #0, and an SB CORESET is not necessarily configured in SB #0. For example, the SB-bitmap corresponding to SB #0 may be repeatedly applied in the same manner to SBs for which SB CORESETs should be configured. In an additional example, an (SB) CORESET for a single LBT-SB (or LBT-BW) may be signaled/configured by an SB-bitmap in a CORESET configuration. Further, a (WB) CORESET over a plurality of LBT-SBs (or LBT-BWs) may be signaled/configured by a WB-bitmap in a CORESET configuration.

FIG. 15 illustrates CORESETs according to an embodiment of the present disclosure. The CORESETs illustrated in FIG. 15 will be described based on the description and assumption of FIG. 14. In FIG. 15, CORESETs are configured in SB #1, SB #3, and SB #4.

Referring to FIG. 15, a first bitmap ("frequencyDomainResource") is signaled by a CORESET configuration, and a second bitmap ("frequency monitor location") is signaled by a PDCCH SS configuration. It is assumed that the second bitmap is 5 bits long and bit 0 to bit 4 corresponding to SB #0 to SB #4 are 01011. In the first bitmap, a bit value 1 may mean that a corresponding frequency SB is to be monitored by the UE and/or a CORSET is configured in the SB.

The UE/BS obtains an SB-bitmap '00101001' from bit 0 to bit 7 of the first bitmap based on SB #0 with the lowest frequency index being related to the SB-bitmap. The UE/BS may identify that CORESETs are to be configured in SB #1, SB #3, and SB #4 from the second bitmap. Accordingly, the UE/BS may configure CORESETs illustrated in FIG. 15 by repeatedly applying the SB-bitmap '00101001' to SB #1, SB #3, and SB #4. As described before, a set of SB CORESETs configured in SB #1, SB #3, and SB #4 may be considered to be one CORESET and have one CORESET ID/index.

In relation to Opt 3, a method of extending the configuration of a single SB CORESET over a plurality of LBT-SBs (or LBT-BWs) by a PDCCH SS configuration (or CORESET configuration) may be required. For example, a single SB CORESET may be repeatedly configured K times in the same manner in a plurality of K LBT-SBs (or LBT-BWs). For this purpose, the following methods may be considered.

1) Method S-1: A reference SB CORESET may be configured based on a CORESET configuration (e.g., one reference SB CORESET configuration is signaled by the CORESET configuration) and then configured (extended/repeated) in one or more LBT-SBs. One or more actual CORESETs may be configured according to a combination of one or more LBT-SBs (or LBT-BWs) over which the reference SB CORESET is configured (extended/repeated). According to an embodiment of the present disclosure, the reference CORESET may be a CORESET related to SB #0 with the lowest frequency index (e.g., FIG. 15).

A. For example, CORESET ID/index #M may be assigned to one reference SB CORESET. Then, an actual CORESET may be configured in the form of CORESET #M−0 configured by configuring the reference SB CORESET only in LBT-SB #1, CORESET #M−1 configured by configuring the reference SB CORESET only in LBT-SB #2, or CORESET #M−2 configured by extending/repeating the reference SB CORESET over LBT-SB #0 and LBT-SB #1. In this case, an SS may be set/configured based on a specific (single) CORESET, CORESET #M-x based on information included in a PDCCH SS configuration.

i. When an actual CORESET is configured by extending/repeating a single (reference) SB CORESET over a plurality of LBT-SBs (or LBT-BWs), the relative position of an SB CORESET may be set equally in each of the LBT-SBs. For example, the same difference/offset (e.g., the parameter "rb-offset" of CORESET Config.) between the position of the starting RB (e.g., RBnStart in FIG. 11) of an LBT-SB and the position of the starting RB of an SB CORESET may be set for the plurality of LBT-SBs (or LBT-BWs).

ii. Alternatively, the relative position of an SB CORESET may be set individually/independently in each LBT-SB. For example, the difference/offset between the position of the starting RB of an LBT-SB and the position of the starting RB of an SB CORESET may be set individually/independently for each LBT-SB (or LBT-BW).

B. In another example, when the BW of a CC (or BWP) is given (with a reference SB CORESET already configured), a plurality of actual CORESETs may be configured according to the number/indexes of LBT-SBs (or LBT-BWs) belonging to/included in the CC (or BWP). For example, for K LBT-SBs, K CORESETs generated by configuring an SB CORESET in each LBT-SB, K/2 CORESETs generated by configuring (extending/repeating) an SB CORESET over two LBT-SBs, . . . , one CORESET generated by configuring (extending/repeating) an SB CORESET over all of the K LBT-SBs are available.

C. Additionally, when an SS is set/configured based on an actual CORESET including a plurality of (reference) SB CORESETs (extended/repeated over a plurality of LBT-SBs (or LBT-BWs)) by a PDCCH SS configuration, an SB CORESET monitoring periodicity/time (e.g., occasion) may be set to be equal for the plurality of SB CORESETs (or LBT-SBs) or may be set individually/independently for each SB CORESET (or LBT-SB).

2) Method S-2: Through a PDCCH SS configuration, a (preconfigured) specific single SB CORESET may be referenced, the corresponding SB CORESET is (extended/repeated) configured over one or a combination of LBT-SBs (or LBT-BWs), and an SS may be configured over the configured one or more SB CORESETs.

A. For example, the (frequency monitoring) locations/indexes of LBT-SBs (or LBT-BWs) in which one or more SB CORESETs (in which a corresponding SS is to be configured) are configured may be indicated by an LBT-SB-wise (or LBT-BW-wise) bitmap (e.g., the second bitmap in FIG. 15) in the PDCCH SS configuration. For example, each bit of the bitmap may correspond to an LBT-SB, as described before with reference to FIG. 15. The first bit (e.g., MSB) of the bitmap may correspond to the first LBT-SB of the BWP. An SB CORESET may be configured in an LBT-SB corresponding to a bit value 1.

i. When a single SB CORESET is extended/repeated over a plurality of LBT-SBs (or LBT-BWs), the relative position of the SB CORESET may be same in each of the LBT-SBs (or LBT-BWs). For example, the same difference/offset (e.g., the parameter "rb-offset" of CORESET Config.) between the position of the starting RB (e.g., RBnStart in FIG. 11) of an LBT-SB (or LBT-BW) and the position of the starting RB of an SB CORESET may be set for the plurality of LBT-SBs (or LBT-BWs).

ii. Alternatively, the relative position of an SB CORESET may be set individually/independently for each LBT-SB (or LBT-BW). For example, the difference/offset between the position of the starting RB of an LBT-SB and the position of the starting RB of an SB CORESET may be set individually/independently for each LBT-SB (or LBT-BW).

B. In another example, the positions of one or more reference (e.g., starting) RBs over which a single SB CORESET area is configured (extended/repeated) or the offset in RBs/RBGs between the positions of the starting RBs of the plurality of SB CORESETs may be indicated by the PDCCH SS configuration.

C. In another example, whether a specific single SB CORESET is configured only in a single LBT-SB (or LBT-BW) (e.g., preconfigured by the CORESET configuration) or configured (extended/repeated) over all of a plurality of LBT-SBs (or LBT-BWs) belonging to the CC or the BWP may be indicated by the PDCCH SS configuration (e.g., by 1-bit signaling).

D. Additionally, when extension/repetition of a single SB CORESET over a plurality of LBT-SBs (or LBT-BWs) is indicated by a PDCCH SS configuration, an SB CORESET monitoring periodicity/time (e.g., occasion) may be set to be equal for the plurality of LBT-SBs or may be set individually/independently for each LBT-SB.

According to an embodiment, Method S-1 and/or Method S-2 may be applied restrictively to a specific CORESET ID/index (e.g., 0) used for configuring/transmitting a PDCCH that schedules a specific broadcast data transmission including an SIB. In another embodiment, Method S-1 and/or Method S-2 may not be limited to the specific CORESET ID/index (e.g., 0).

Figure 16:
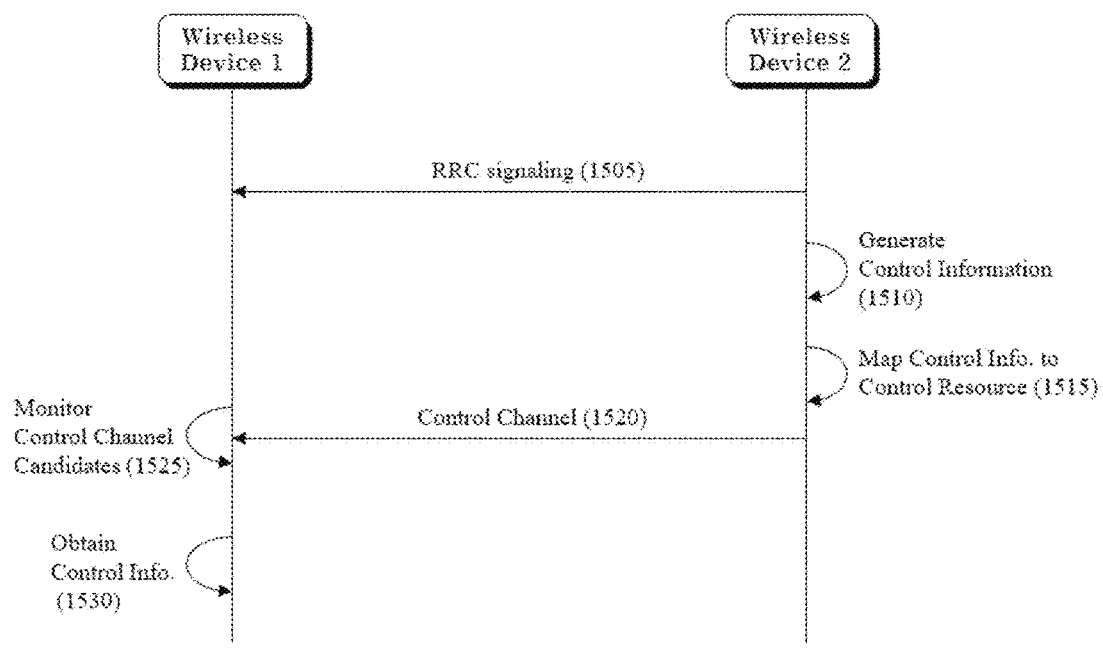
FIG. 16 is a diagram illustrating a signal flow for control signal transmission/reception according to an example of the present disclosure.

FIG. 16 is intended to describe an exemplary implementation based on a control signal reception process based on Opt 1/3, not limiting the present disclosure.

In FIG. 16, a wireless device 1 and a wireless device 2 are different wireless communication devices which may operate in the same wireless communication system. The wireless communication system may be, for example, a 3GPP wireless communication system. While it is assumed for convenience of description that the wireless device 1 is a UE, the wireless device 2 is a BS, and the BS and the UE transmit and receive DCI on a PDCCH in FIG. 16, the present disclosure is not limited thereto. In another example, the wireless device 1/wireless device 2 may be a UE/UE (e.g., D2D communication UEs, sidelink communication UEs, or V2X UEs), a BS/BS (e.g., wireless backhaul-supporting BSs or IAB-supporting BSs), or a BS/UE (e.g., UCI transmission/reception).

Figure 17:
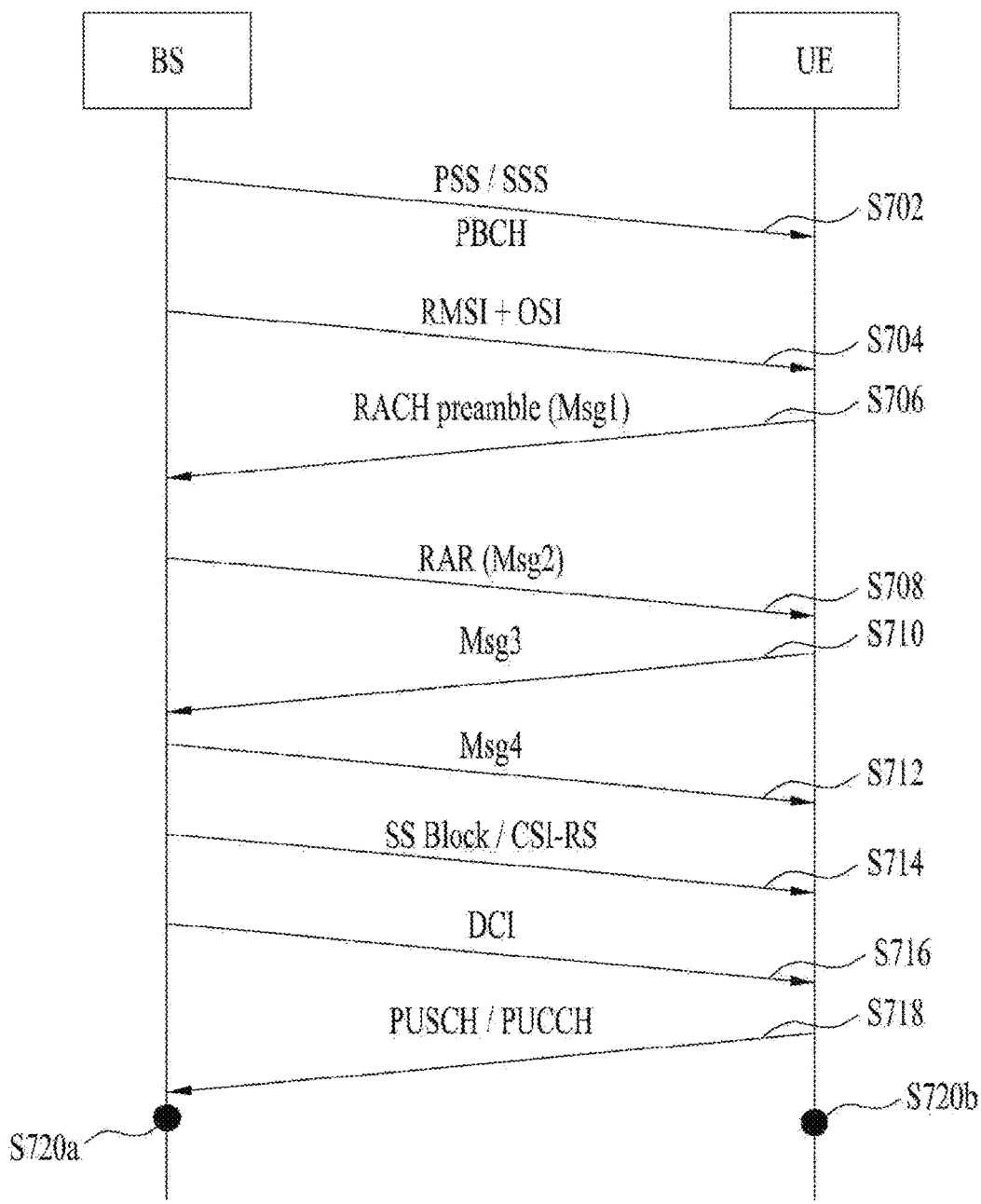
FIG. 17 is a diagram illustrating a signal flow for a network access process applied to the present disclosure.

For example, the UE may access the BS in an initial access process (e.g., FIG. 17). For example, the UE may further perform a DRX operation (e.g., FIG. 22).

The UE may receive information by RRC signaling from the BS (1505). The RRC signaling may include various RRC messages such as an RRC setup message for setting up an RRC connection and/or an RRC reconfiguration message for reconfiguring an RRC connection. An RRC connection process may be performed in an RACH procedure (e.g., FIG. 17). The information received by the RRC signaling may include CORESET configuration information and/or PDSCH SS configuration information for a BWP. The CORESET configuration information and the PDSCH SS configuration information may be transmitted in the same or different RRC messages (e.g., see the description of FIG. 5). The CORESET configuration information may include information about frequency resources included in a CORESET (e.g., the parameter "frequencyDomainResources). A frequency-domain offset of the CORESET (e.g., the parameter "rb-offset") may further be included as information about the frequency resources of the CORESET. The PDCCH SS configuration information may include information about SBs (e.g., RB sets). The information about SBs may include information indicating SBs for PDCCH monitoring (e.g., the second bitmap in FIG. 15) among the SBs of the BWP. SB CORESETs may be configured in the SBs for PDCCH monitoring based on the CORESET configuration information. For example, the SBs for PDCCH monitoring may be determined by the BS.

The BS may generate control information (e.g., DCI) (1510). The generated DCI may be transmittable in a USS.

The BS may map the control information to control resources (1515). The control resources, which are located in the CORESET configured based on the CORESET con-figuration, may be selected from among PDCCH candidates (e.g., a PDCCH SS) that the UE monitors based on the PDCCH SS configuration.

The BS may transmit the control information mapped to the control resources on a control channel (e.g., a PDCCH) (1520).

The UE may monitor control channel candidates (e.g., PDCCH candidates) (1525). PDCCH monitoring may amount to attempting PDCCH detection (e.g., blind detection or blind decoding of a PDCCH) at the UE. The UE may identify a set of PDCCH candidates to be monitored in one or more CORESETs based on the information (e.g., the CORESET configuration information and/or the PDCCH SS configuration information) obtained from the RRC signaling. For example, the UE may monitor PDCCH candidates in one or more SBs configured with SB CORESETs among a plurality of SBs (e.g., RB sets) included in the BWP. The UE may monitor the PDCCH candidates, assuming that the SB CORESETs configured in the one or more SBs to be one specific CORESET (e.g., one CORESET having the same CORESET ID). The UE may identify from the PDCCH SS configuration that the PDCCH SS is associated with the specific CORESET. The UE may identify whether information (e.g., the second bitmap in FIG. 15) about monitoring SBs (e.g., included in the PDCCH SS) is provided based on the RRC signaling (e.g., see the description of FIG. 14/15 in Proposal 1/2 and Proposal 3). Further, the UE may identify that the specific CORESET associated with the corresponding PDCCH SS is configured as a group of SB CORESETs, based on the information (e.g., the second bitmap in FIG. 15) about monitoring SBs (e.g., included in the PDCCH SS) being provided by the RRC signaling, such as the PDCCH SS configuration and so on. As described before, the SB CORESETs may be repetitions of the same SB CORESET at different frequency locations, and may be based on the same CORESET configuration. The UE may attempt to blind-decode DCI formats receivable in a USS, assuming that the specific CORESET configured in this manner is related to the USS.

Figure 22:
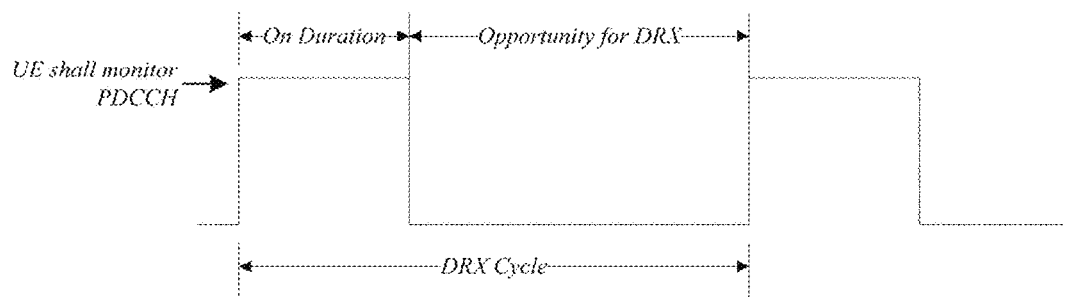
FIG. 22 illustrates an exemplary discontinuous reception (DRX) operation applied to the present disclosure.

When the UE is configured with DRX as illustrated in FIG. 22, the UE may monitor PDCCH candidates during an On Duration in a DRX cycle. When the UE fails to detect a PDCCH during the On Duration in the DRX cycle as a result of the monitoring, the UE may return to a sleep state and monitor PDCCH candidates during an On Duration in the next DRX cycle.

Upon detection of the control channel (e.g., PDCCH) as a result of the monitoring, the UE may obtain control information (e.g., DCI) from the detected control channel (1530).

For example, based on at least one of (i) a BWP including a plurality of SBs (e.g., SB configuration information being provided) or (ii) information about the frequency locations of SBs for PDCCH candidate monitoring (e.g., the second bitmap in FIG. 15) being provided, frequency resource information (e.g., the parameter "frequencyDomainResource") included in CORESET configuration information may be confined to a part corresponding to a specific subband (e.g., SB #0), and the same CORESET may be configured on an SB basis in the BWP (e.g., the same CORESET may be repeatedly configured in each PDCCH candidate monitoring SB based on a part corresponding to SB #0 in the frequency resource information) (e.g., CORESET 'B' in FIG. 14 and CORESET 'C' in FIG. 15). An SB may include a frequency band (e.g., LBT-BW) for which LBT is performed. The SBs may be (substantially or approximately) of the same frequency-domain size.

On the contrary, based on frequency resources for configuring a CORESET being larger than a single LBT band, SB configuration information for a BWP not being provided, and/or information about the frequency locations of PDCCH candidate monitoring SBs not being provided, only one CORESET (e.g., CORESET 'A' in FIG. 14) may be configured across the total frequency resources in the BWP. Further, based on a BWP operating in an LCell, only one CORESET (e.g., CORESET 'A' in FIG. 14) may be configured based on frequency resources in the BWP.

Additionally, with a specific CSI-RS (resource) configured in the form of an SB CSI-RS belonging only to/included only in a single LBT-SB (or confined to the corresponding LBT-BW), the single SB CSI-RS may be extended over a plurality of LBT-SBs (or LBT-BWs). For example, the single SB CSI-RS may be repeatedly configured K times over a plurality of K LBT-SBs (or LBT-BWs). In this case, the proposed methods may be applied in a similar manner.

A rule indicating/identifying whether a (specific) CSI-RS resource is an SB CSI-RS belong only to/included only in a (specific) single LBT-SB (or LBT-BW) may be required. For this purpose, the following methods may be considered.

1) Method R-1: When an RS-RB set in which a single CSI-RS resource is configured is indicated based on an RB set (the indexes of RBs in the RB set) in a whole CC or BWP, and when the RS-RB set includes only RBs belonging to/included in a specific single LBT-SB (or LBT-BW), the configured CSI-RS resource may correspond to an SB CSI-RS.

2) Method R-2: An RS-RB set in which a single CSI-RS resource is configured may be indicated based on an RB set (the indexes of RBs in the RB set) in a single LBT-SB (or LBT-BW).

A. Information about the position/index of the LBT-SB (or LBT-BW) which the RS-RB set (CSI-RS resource according to the RS-RB set) is applied to/configured in may be indicated by a CSI-RS (resource) configuration.

B. Alternatively, the position/index of the LBT-SB (or LBT-BW) which the RS-RB set (CSI-RS resource according to the RS-RB set) is applied to/configured in may be preset as the lowest frequency or index in the CC or BWP.

Then, a method of extending configuration of a single SB CSI-RS resource over a plurality of LBT-SBs (or LBT-BWs) through a CSI-RS (resource) configuration may be required. For example, a single SB CSI-RS may be repeatedly configured K times in the same manner in a plurality of K LBT-SBs (or LBT-BWs). For this purpose, the following methods may be considered.

1) Method R-3: One reference SB CSI-RS resource may be configured or a (preconfigured) specific single SB CSI-RS (resource) may be referred to. Then, a combination of one or more LBT-SBs (or LBT-BWs) over which the (reference) SB CSI-RS resource is configured (extended/repeated) may be configured, and the configured one or more SB CSI-RSs (SB CSI-RS resources) may be set/configured as an actual single SB CSI-RS (resource).

A. For example, the positions/indexes of LBT-SBs (or LBT-BWs) in which the one or more SB CSI-RSs (SB CSI-RS resources) are configured may be indicated by an LBT-SB-wise (or LBT-BW-wise) bitmap in a CSI-RS (resource) configuration. For example, each bit of the bitmap corresponds to an LBT-SB, and the MSB of the bitmap corresponds to the first LBT-SB of the BWP. An SB CSI-RS (resource) may be configured in an LBT-SB corresponding to a bit set to 1.

i. When a single (reference) SB CSI-RS (resource) is configured (extended/repeated) over a plurality of LBT-SBs (or LBT-BWs), the relative position of the SB CSI-RS may be same in each LBT-SB (or LBT-BW). For example, the difference/offset between the position of the starting RB of an LBT-SB and the position of the starting RB of an SB CSI-RS (resource) may be set to be equal for the plurality of LBT-SBs (or LBT-BWs).

ii. Alternatively, the relative position of an SB CSI-RS may be set individually/independently in each LBT-SB (or LBT-BW). For example, the difference/offset between the position of the starting RB of an LBT-SB and the position of the starting RB of an SB CSI-RS may be set individually/independently for each LBT-SB (or LBT-BW).

B. In another example, the positions of one or more reference (e.g., starting) RBs to which a single (reference) SB CSI-RS resource region is configured (extended/repeated) or the offset in RBs/RBGs between the positions of the starting RBs of a plurality of SB CSI-RS resources may be indicated by a CSI-RS (resource) configuration.

C. In another example, whether a specific single SB CSI-RS (resource) is configured only in a (e.g., preconfigured) single LBT-SB (or LBT-BW) or (extended/repeated) over all of a plurality of LBT-SBs (or LBT-BWs) belonging to the CC or the BWP may be indicated by a CSI-RS (resource) configuration (e.g., by 1-bit signaling).

D. Additionally, when an actual CSI-RS is set/configured with a plurality of (reference) SB CSI-RSs (SB CSI-RS resources) (extended/repeated over a plurality of LBT-SBs (or LBT-BWs)) by a CSI-RS (resource) configuration, a periodicity/time (e.g., occasion) for SB CSI-RS transmission/measurement may be set to be equal for the plurality of LBT-SBs or individually/independently for each LBT-SB.

Secondly, PDCCH BD (candidate) allocation may be performed according to the result of BS LBT for a plurality of LBT-SBs in a WB-CC/BWP in the following methods.

1) Note 1: The following operations may be applied to an SS configured according to the afore-described Opts (e.g., Opt 1/3).

A. It is assumed hereinbelow that the number of BDs given to an SS (configuration) based on the afore-described Opts is K.

2) Opt A: A total of K BDs (BD candidates) may be allocated over all of a plurality of LBT-SBs (in a WB CORESET) or SB CORESETs configured in the SS.

A. When (all or) only a part of the plurality of LBT-SBs in the WB-CC/BWP are indicated/detected as LBT-pass-SBs by a specific signal/signaling, the following methods may be performed.

B. Opt A-1: K BDs (BD candidates) may be allocated only to one specific LBT-pass-SB or one specific SB CORESET (e.g., having the lowest LBT-SB or CORESET index or the highest selection priority level (among the preconfigured selection priority levels of LBT-SBs or CORESETs)) among the LBT-pass-SBs (in the WB CORESET) or SB CORESETs configured in a corresponding LBT-pass-SB.

i. In this case, BD allocation/execution may be skipped for the remaining LBT-SBs or SB CORESETs (PDCCH candidates configured in the remaining LBT-SBs or SB CORESETs).

C. Opt A-2: With K BDs (BD candidates) (virtually) distributed across a plurality of LBT-SBs (in a WB CORESET) or a plurality of SB CORESETs (e.g., Kp (<K) PDCCH candidates are configured in each of the LBT-SBs or the SB CORESETs) where Kp is equal or different for the LBT-SBs or the SB CORESETs), only the Kp BDs (BD candidates) configured in an LBT-pass-SB or an SB CORESET of the corresponding LBT-SB may finally be allocated.

i. The sum of the Kp values (virtually) set for the plurality of LBT-SBs (in the WB CORESET) or the plurality of SB CORESETs may be set to K.

ii. BD allocation/execution may be skipped for the (the PDCCH candidates configured in) the remaining LBT-fail-SBs or SB CORESETs (configured in the LBT-fail-SBs).

D. Opt A-3: K BDs (BD candidates) may be distributed across all LBT-pass-SBs (in a WB CORESET) or all SB CORESETs configured in a corresponding LBT-pass-SB. For example, Kp (<K) PDCCH candidates may be allocated to each of the LBT-pass-SBs or the SB CORESETs (Kp is equal or different for the LBT-SBs or the SB CORESETs).

i. The sum of Kp values (finally) set for the LBT-SBs (in the WB CORESET) or the corresponding LBT-SB may be set to K.

ii. BD allocation/execution may be skipped for the (PDCCH candidates configured in) the remaining LBT-fail-SBs or SB CORESETs (configured in the LBT-fail-SBs).

3) Opt B: K BDs may be allocated to each of a plurality of LBT-SBs (in a WB CORESET) or each of a plurality of SB CORESETs, which are configured in an SS.

A. When (all or) only a part of the plurality of LBT-SBs in the WB-CC/BWP are indicated/detected as LBT-pass-SBs by a specific signal/signaling, the following operations may be performed.

B. Opt B-1: The K BDs (BD candidates) configured in each of the LBT-pass-SBs (in the WB CORESET) or each of the SB CORESETs of a corresponding LBT-pass-SB may be allocated.

i. BD allocation/execution may be skipped for the (PDCCH candidates configured in) the remaining LBT-fail-SBs or SB CORESETs (configured in the LBT-fail-SBs).

Thirdly, when a maximum number of PDCCH BDs (e.g., max BD limit) that the UE may perform in a single slot on a single CC/BWP is set/determined, an actual BD candidate may be allocated in the following methods.

1) Note 1: When the number of (pre)configured/allocated BDs in a CSS and a USS is larger than the max BD limit, the following operation may be performed.

A. In the following description, LBT-SB may be replaced with LBT-pass-SB.

2) Opt X: Method of allocating BD candidate at SS level.

A. For a plurality of LBT-SBs (in a WB CORESET) or SSs configured in SB CORESETs of the plurality of LBT-SBs, BD candidates may first be allocated to an LBT-SB, CORESET, or SS having the highest priority level.

i. The plurality of LBT-SBs, the plurality of CORESETs, or the plurality of SSs may be pre-prioritized (by the BS), the LBT-SBs, CORESETs or SSs may be prioritized such that LBT-SBs, CORESETs, or SSs with lower indexes have higher priority levels, and/or priority may be given to a CSS over a USS.

ii. For an LBT-SB/LBT-pass-SB which has not been selected in the above operation (i.e., which has a low priority level) or (an SS configured in) an SB CORESET (in the SB), BD allocation/execution may be skipped.

iii. In this case, BD allocation/execution may be skipped for the remaining LBT-fail-SBs or (SSs configured in) the remaining SB CORESETs (in the LBT-fail-SBs).

B. When a WB CORESET (over a plurality of LBT-SBs) or a plurality of SB CORESETs are configured in a specific (single) CSS and/or USS, the following operations may be performed.

C. Opt X-1: Only when all of a plurality of LBT-SBs (in which the WB CORESET or SB CORESETs are configured) are LBT-pass-SBs, BD candidates may be allocated to the whole CSS/USS. Otherwise, BD allocation/execution may be skipped for the whole CSS/USS.

D. Opt X-2: BD candidates may be allocated to a corresponding CSS/USS only in an actual LBT-pass-SB among the plurality of LBT-SBs (in which the WB CORESET or SB CORESETs are configured). BD allocation/execution for a corresponding CSS/USS may be skipped for the remaining LBT-fail-SBs.

E. Note 2: For example, for a CSS (an SS or BD candidates configured for a special PDCCH (transmission)), Opt X-1 or Opt X-2 may be applied, whereas for a USS (or an SS/BD candidates except for the SS/BD candidates configured for the special PDCCH), Opt X-2 may be applied.

3) Note 3: The following operations may be applied to a (single) SS set/configured according to the above Opt (e.g., Opt 1/3).

A. In the following description, LBT-SB may be replaced with LBT-pass-SB.

4) Opt Y: Method of allocating BD candidate at LBT-SB level or SB CORESET level

A. For a plurality of LBT-SBs or a plurality of SB CORESETs (configured in the plurality of LBT-SBs) configured in an SS, a BD candidate may first be allocated to an LBT-SB or CORESET having the highest priority.

i. The plurality of LBT-SBs or the plurality of CORESETs may be pre-prioritized (by the BS), or higher priority levels may be assigned to LBT-SBs or CORESETs with lower indexes.

ii. For LBT-SBs/LBT-pass-SBs which have not been selected in the above operation (i.e., which have low priority levels) or SB CORESETs (in the SBs), BD allocation/execution may be skipped.

iii. In this case, BD allocation/execution may be skipped for the remaining LBT-fail-SBs or the remaining SB CORESETs (in the LBT-fail-SBs).

(4) Proposal 4

The NR system supports both of a general CP-OFDM scheme and a DFT-s-OFDM scheme that applies DFT (at the front end of IFFT) as a waveform for transmission of a UL channel (e.g., PUSCH or PUCCH) from a UE. Accordingly, one of the two types of waveforms may be configured/indicated semi-statically or dynamically for a UL channel transmission of the UE in consideration of a situation/performance such as the UL transmission coverage of the UE, peak-to-average power ratio (PAPR) characteristics of the UL transmission, and frequency efficiency of the UL transmission in the NR system.

In the NR U-band situation, one UL channel transmission over a WB-CC/BWP including a plurality of LBT-SBs may be scheduled/indicated. In this case, the UE may have to perform LBT for each individual LBT-SB allocated for the single UL channel transmission (just before the UL channel transmission). In this case, when LBT is successful only in some of the plurality of LBT-SBs (allocated for the single UL channel transmission), the following two transmission operations may be considered.

1) Opt 1: Signal mapping/transmission is skipped (for an LBT-fail-SB) by performing puncturing (or rate-matching) (resources corresponding to) a signal to be mapped to the LBT-fail-SB, while a UL channel signal is mapped/transmitted only in the remaining LBT-pass-SBs.

2) Opt 2: The transmission of the whole UL channel signal is dropped.

Based on the above description, a method of applying a different transmission method (e.g., Opt 1 or Opt 2) according to a waveform used for a UL channel transmission may be considered. For example, when CP-OFDM is used for the UL channel transmission, Opt 1 may be applied, whereas when DFT-s-OFDM is used, Opt 2 may be applied. When Opt 1 is combined with DFT-s-OFDM, the signal processing time of the UE may be too short to perform the DFT operation again only for the remaining LBT-pass-SB part except for an LBT-fail-SB part until the UL transmission after LBT is performed.

In another method, when a UL channel transmission is scheduled/indicated as performed in DFT-s-OFDM and a plurality of LBT-SBs are allocated to the UL channel transmission, an operation of generating a DFT-s-OFDM signal by applying the DFT operation to each individual LBT-SB may be considered. Further, when a plurality of LBT-SBs are allocated to a DFT-s-OFDM-based UL channel transmission, whether to apply a separate DFT operation to each LBT-SB or a single DFT operation to all of the plurality of LBT-SBs may be configured/indicated for/to the UE, semi-statically (e.g., by RRC signaling) or dynamically (e.g., by DCI (e.g., UL grant)).

Additionally, when a UL channel transmission is scheduled/indicated as performed in CP-OFDM (or DFT-s-OFDM) and a plurality of LBT-SBs are allocated to the UL channel transmission, a CP-OFDM (or DFT-s-OFDM) signal may be generated by applying an IFFT operation to each individual LBT-SB. Further, when a plurality of LBT-SBs are allocated to a CP-OFDM-based (or DFT-s-OFDM-based) UL channel transmission, whether to apply a separate IFFT operation to each LBT-SB or a single IFFT operation to all of the plurality of LBT-SBs may be configured/indicated for/to the UE, semi-statically (e.g., by RRC signaling) or dynamically (e.g., by DCI (e.g., UL grant)). When a separate IFFT operation is configured/indicated for the UL channel transmission, Opt 1 may be applied, whereas when a single IFFT operation is configured/indicated, Opt 2 may be applied.

In another method, when a plurality of LBT-SBs are allocated for one UL channel transmission, and mapping/transmission of a DMRS to/in first some (e.g., 1 or 2) symbols of a resource region allocated for the UL channel transmission is configured/indicated, Opt 1 may be applied. On the other hand, when mapping/transmission of the DMRS to/in a symbol other than the first symbol(s) or mapping/transmission of data (or UCI) to/in the first symbol(s) is configured/indicated, Opt 2 may be applied. In another method, when a plurality of LBT-SBs are allocated for one UL channel (e.g., PUSCH) transmission, and transmission of another specific UL channel/signal (e.g., SRS) adjacent to and before the UL channel transmission in TDM is configured/indicated, Opt 1 may be applied. On the contrary, when there is no configuration/indication of any other UL transmission adjacent to and before the UL channel transmission, Opt 2 may be applied.

(In relation to the above operation), when a plurality of LBT-SBs are allocated for transmission of one UL channel, a DMRS sequence for the UL channel may be generated for/mapped to each individual LBT-SB. For example, the length of the DMRS sequence mapped to/transmitted in each LBT-SB may be determined to be a value equal to the BW of the LBT-SB or the amount of frequency resources (e.g., the number of REs) allocated to the actual UL channel transmission within the LBT-SB (or a value equivalent to the amount of frequency resources). Additionally, (for PAPR reduction), different base sequences (e.g., root indexes) and/or cyclic shifts used to generate DMRS sequences mapped to/transmitted in the plurality of LBT-SBs allocated for the single UL channel transmission may be set for the LBT-SBs.

Additionally, when one PUSCH transmission resource is allocated/scheduled across a plurality of LBT-SBs, an operation of transmitting UCI (e.g., an HARQ-ACK or a CSI report) on a corresponding PUSCH by piggyback may be required. In this case, Opt a) the UE may repeatedly map the UCI to all of the plurality of LBT-SBs allocated for the PUSCH transmission (e.g., repeatedly map the same (coded) UCI bit in each of the plurality of LBT-SBs), or Opt b) the UE may piggyback the UCI to the PUSCH by mapping the UCI only to a specific part of the plurality of LBT-SBs (e.g., a single LBT-SB). In Opt a/b (especially Opt b), a seed value for a scrambling sequence applied to the (coded) UCI bit piggybacked to the specific LBT-SB may be calculated (to be a different value) according to an LBT-SB index (or the index of a specific RB of the LBT-SB).

(5) Proposal 5

In the NR U-band situation, it may be configured that UL grant DCI transmitted in a specific CCE, CCE #1 indicates a PUSCH transmission in CCE #2 different from CCE #1. It may be configured that even in one CC/BWP, UL grant DCI transmitted in a specific LBT-SB, LBT-SB #1 indicates a PUSCH transmission in LBT-SB #2 different from LBT-SB #1. In this PUSCH scheduling situation, when a backoff-based LBT type (e.g., Cat-4 LBT) using a variable contention window size (CWS) is indicated for a PUSCH transmission, the BS may perform a short (25 usec) CCA gap-based LBT type (e.g., Cat-2 LBT) without backoff shortly after the ending time of the PUSCH transmission to transmit a DL channel/signal (e.g., PDCCH) in CCE #2 or LBT-SB #2 in which the PUSCH has been transmitted/received.

In the NR U-band situation, it may further be configured/indicated that an HARQ-ACK (PUCCH) signal corresponding to DL grant DCI and a PDSCH transmitted in CCE #1 is transmitted in CCE #2 different from CCE #1. It may be configured/indicated that even in one CC/BWP, an HARQ-ACK (PUCCH) signal corresponding to DL grant DCI and a PDSCH transmitted in a specific LBT-SB, LBT-SB #1 is transmitted in LBT-SB #2 different from LBT-SB #1. In this HARQ-ACK PUCCH transmission situation, when a backoff-based LBT type (e.g., Cat-4 LBT) using a variable CWS is indicated for the PUCCH transmission, the BS may perform a short (25 usec) CCA gap-based LBT type (e.g., Cat-2 LBT) without backoff shortly after the ending time of the PUCCH transmission to transmit a DL channel/signal (e.g., PDCCH) in CCE #2 or LBT-SB #2 in which the PUCCH has been transmitted/received.

Even in the case of a periodic UCI (e.g., SR or CSI) PUCCH transmission configured by a higher-layer signal (e.g., RRC signaling), when a backoff-based LBT type (e.g., Cat-4 LBT) through a variable CWS is configured for the periodic UCI PUCCH transmission, the BS may perform a short (25-usec) CCA gap-based LBT type without back-off (e.g., Cat-2 LBT) immediately after the ending time of the PUCCH transmission, to transmit a DL channel/signal (e.g., PDCCH) in an CC or LBT-SB in which the PUCCH has been transmitted/received.

The UE may perform a network access process to perform the afore-described/proposed procedures and/or methods. For example, while accessing the network (e.g., BS), the UE may receive system information and configuration information required to perform the afore-described/proposed procedures and/or methods and store the received information in a memory. The configuration information required for the present disclosure may be received by higher-layer (e.g., RRC or medium access control (MAC)) signaling.

FIG. 17 is a diagram illustrating an initial network access and subsequent communication process. In NR, a physical channel and an RS may be transmitted by beamforming. When beamforming-based signal transmission is supported, beam management may follow, for beam alignment between a BS and a UE. Further, a signal proposed by the present disclosure may be transmitted/received by beamforming. In RRC IDLE mode, beam alignment may be performed based on an SSB, whereas in RRC CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 17, a BS (e.g., eNB) may periodically transmit an SSB (S702). The SSB includes a PSS/SSS/PBCH. The SSB may be transmitted by beam sweeping. The BS may then transmit remaining minimum system information (RMSI) and other system information (OSI) (S704). The RMSI may include information required for initial access to the BS (e.g., PRACH configuration information). After detecting SSBs, the UE identifies the best SSB. The UE may then transmit an RACH preamble (Message 1 or Msg1) in PRACH resources linked/corresponding to the index (i.e., beam) of the best SSB (S706). The beam direction of the RACH preamble is associated with the PRACH resources. Association between PRACH resources (and/or RACH preambles) and SSBs (indexes) may be configured by system information (e.g., RMSI). Subsequently, in an RACH procedure, the BS may transmit a random access response (RAR) (Msg2) in response to the RACH preamble (S708), the UE may transmit Msg3 (e.g., RRC Connection Request) based on a UL grant included in the RAR (S710), and the BS may transmit a contention resolution message (Msg4) (S720). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S714). The SSB/CSI-RS may be used for the UE to generate a beam/CSI report. The BS may request the UE to transmit a beam/CSI report, by DCI (S716). In this case, the UE may generate a beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and the UE may switch beams based on the beam/CSI report (S720a and S720b).

Subsequently, the UE and the BS may perform the above-described/proposed procedures and/or methods. For example, the UE and the BS may transmit a wireless signal by processing information stored in a memory or may process a received wireless signal and store the processed signal in the memory according to the proposals of the present disclosure, based on configuration information obtained in the network access process (e.g., a system information acquisition process, an RRC connection process through an RACH, and so on). The wireless signal may include at least one of a PDCCH, a PDSCH, or an RS on DL and at least one of a PUCCH, a PUSCH, or an SRS on UL. Specifically, the UE may receive a CORESET configuration and an SS (set) configuration as described in the present disclosure from the BS as a part of the network access process (e.g., the system information acquisition process, the RRC connection process through an RACH, and so on).

Accordingly, a CORESET and an SS may be configured in a CC/BWP according to the proposed methods of the present disclosure (e.g., see FIGS. 12 to 15). Further, the BS may generate and transmit a PDCCH, and the UE may attempt to detect the PDCCH by monitoring PDCCH candidates according to the proposed methods of the present disclosure (e.g., see FIG. 16).

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 20:
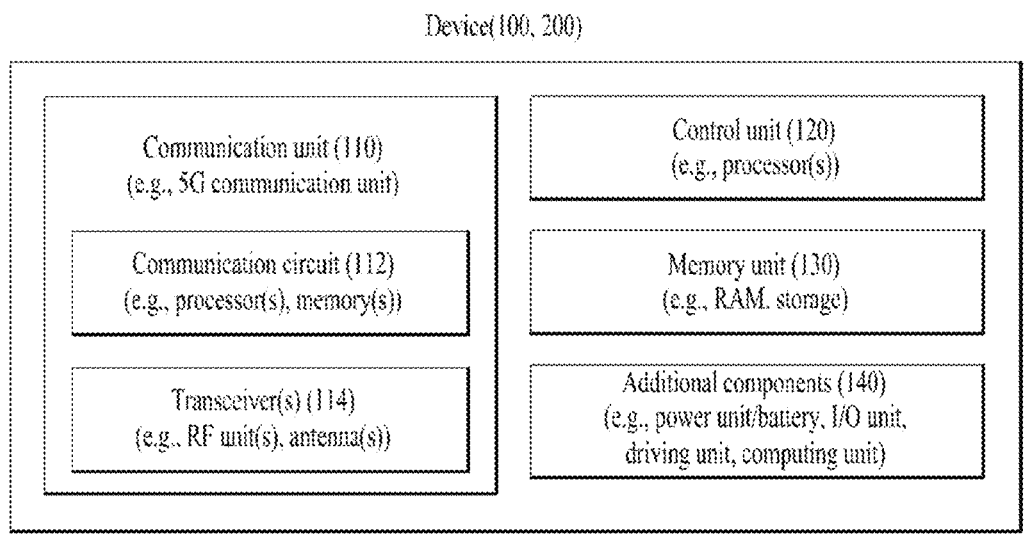

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
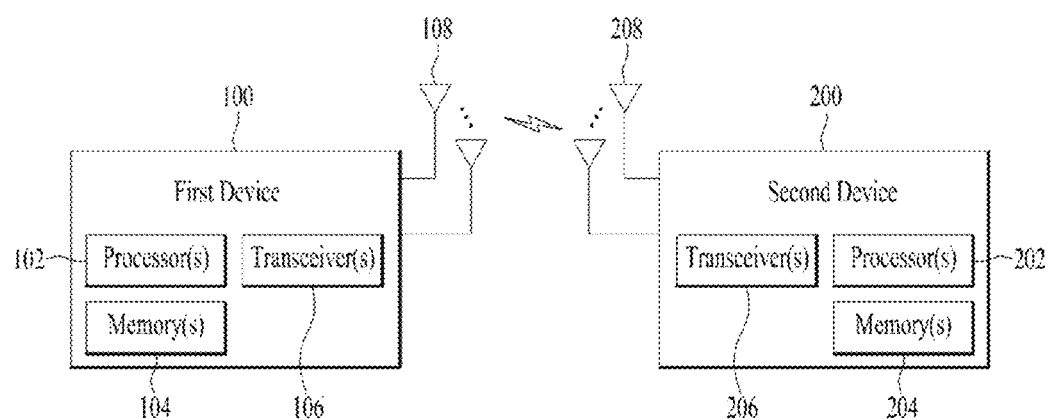

FIG. 19 illustrates wireless devices applicable to the present disclosure.

Figure 18:
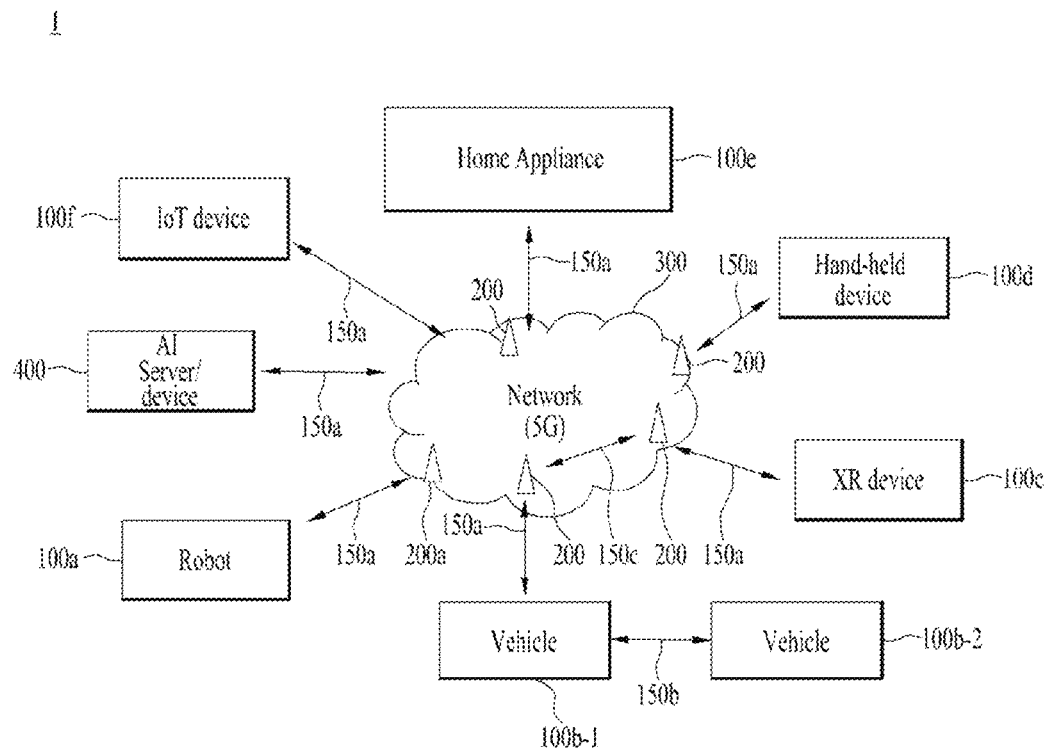
FIGS. 18 to 21 illustrate a communication system 1 and wireless devices applied to the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 20 illustrates another example of a wireless device applied to the present disclosure. The wireless device may be implemented in various forms according to a use-case/service (refer to FIG. 20).

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 21:
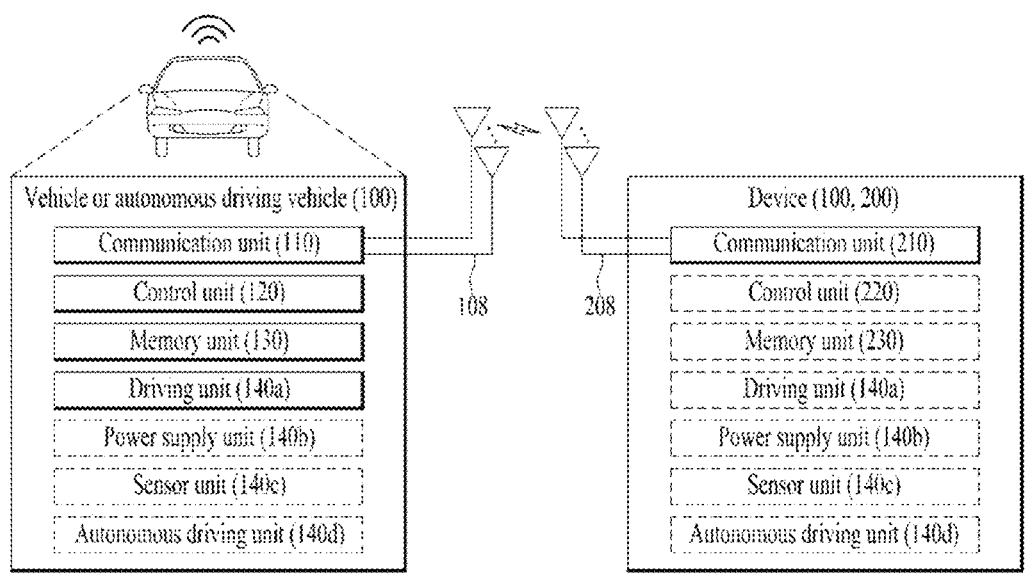

FIG. 21 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 21, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

FIG. 22 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 22, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 5 describes a DRX operation of a UE (in the RRC_CONNECTED state). Referring to Table 5, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 5

| Type of signals | UE procedure |
| --- | --- |
| $1^{st}$ step RRC signalling(MAC-CellGroupConfig) | Receive DRX configuration information |
| $2^{nd}$ Step MAC CE((Long) DRX command MAC CE) | Receive DRX command |
| $3^{rd}$ Step — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

For example, specifically, the UE may receive the aforedescribed CORESET configuration and SS (set) configuration and configure a CORESET and an SS in a CC/BWP based on the CORESET configuration and the SS (set) configuration (e.g., see FIGS. 12 to 15). Further, the UE may attempt to detect a PDCCH by monitoring PDCCH candidates during the On Duration of a DRX cycle (e.g., see FIG. 16). When the BS generates/maps/transmits a PDCCH for/to the UE, the BS may transmit the PDCCH during the On Duration so that the UE may detect the PDCCH. According to an embodiment of the present disclosure, a method of receiving a signal by the wireless communication device 1 may include monitoring control channel candidates in a BWP including one or more SBs based on a control channel SS configuration and a CORESET configuration which are associated with each other, and obtaining control information from a control channel detected as a result of monitoring the control channel candidates. In monitoring the control channel candidates, the wireless communication device 1 may configure each CORESET frequency resource area in each SB of the BWP based on a CORESET frequency resource area of a specific SB of the BWP. The specific SB may be limited to one SB located at a lowest frequency among the one or more SBs included in the BWP.

According to an embodiment of the present disclosure, a device for processing a signal for wireless communication may include at least one memory storing one or more instructions, and at least one processor that executes the one or more instructions stored in the at least one memory. According to the execution of the one or more instructions, the at least one processor may monitor control channel candidates in a BWP based on a control channel SS configuration and a CORESET configuration, and obtain control information from a control channel detected as a result of monitoring the control channel candidates. A CORESET configured based on the CORESET configuration may be associated with a control channel SS configured based on the control channel SS configuration. The BWP may include one or more SBs. For monitoring the control channel candidates, the at least one processor may configure each CORESET frequency resource area in each SB of the BWP based on a CORESET frequency resource area of a specific SB of the BWP. The specific SB may be limited to one SB located at a lowest frequency among the one or more SBs included in the BWP.

According to an embodiment of the present disclosure, the wireless communication device 1 may include a receiver and at least one processor that controls the receiver. The at least one processor may monitor control channel candidates in a BWP based on a control channel SS configuration and a CORESET configuration and obtain control information from a control channel detected as a result of monitoring the control channel candidates. A CORESET configured based on the CORESET configuration may be associated with an SS configured based on the control channel SS configuration. The BWP may include one or more SBs. For monitoring the control channel candidates, the at least one processor may configure each CORESET frequency resource area in each SB of the BWP based on a CORESET frequency resource area of a specific SB of the BWP. The specific SB may be limited to one SB located at a lowest frequency among the one or more SBs included in the BWP.

According to an embodiment of the present disclosure, a method of transmitting a signal by the wireless communication device 2 may include selecting at least one of control channel candidates in a BWP based on a control channel SS configuration and a CORESET configuration, and transmit a control channel carrying control information in the at least one control channel candidate. A CORESET configured based on the CORESET configuration may be associated with an SS configured based on the control channel SS configuration. The BWP may include one or more SBs. The wireless communication device 2 may configure each CORESET frequency resource area in each SB of the BWP based on a CORESET frequency resource area of a specific SB of the BWP. The specific SB may be limited to one SB located at a lowest frequency among the one or more SBs included in the BWP.

According to an embodiment of the present disclosure, the wireless communication device 2 may include a transmitter and at least one processor configured to control the transmitter. The at least one processor may select at least one of control channel candidates in a BWP based on a control channel SS configuration and a CORESET configuration, and transmit a control channel carrying control information in the at least one control channel candidate. A CORESET configured based on the CORESET configuration may be associated with an SS configured based on the control channel SS configuration. The BWP may include one or more SBs. The at least one processor may configure each CORESET frequency resource area in each SB of the BWP based on a CORESET frequency resource area of a specific SB of the BWP. The specific SB may be limited to one SB located at a lowest frequency among the one or more SBs included in the BWP.

According to an embodiment of the present disclosure, a processor-readable recording medium recorded thereon a program for performing the above-described signal reception method may be provided. According to an embodiment of the present disclosure, a processor-readable recording medium recorded thereon a program for performing the above-described signal transmission method may be provided.

Each SB may correspond to an RB set.

The specific SB may be RB set #0 having a lowest index in the BWP.

The control channel SS configuration may include information indicating at least one SB located at a frequency in which the wireless communication device 1 is to monitor the control channel candidates among the one or more SBs included in the BWP.

The wireless communication device 1/2 may configure the same CORESET frequency resource area as the CORESET frequency resource area of the specific SB in the at least one SB indicated by the control channel SS configuration.

The wireless communication device 1 may obtain information about a CORESET frequency resource area of RB set #0 from the CORESET configuration, and the wireless communication device 2 may provide the information about the CORESET frequency resource area of RB set #0 by the CORESET configuration.

The information about the CORESET frequency resource area of RB set #0 may be applied commonly to each RB set for monitoring the control channels candidates.

Each CORESET frequency resource area configured in each SB of the BWP may be related to the same single CORESET index.

The wireless communication device 1 may obtain information about the CORESET frequency resource area of the specific SB from a bitmap indicating CORESET frequency-domain resources included in the CORESET configuration.

A frequency location for monitoring the control channel candidates may be indicated on an SB basis by specific signaling. The wireless communication device 1/2 may configure the CORESET frequency resource area of the each SB, based on information about the frequency location for monitoring the control channel candidates being obtained by the specific signaling The wireless communication device 1 may obtain, from the wireless communication device 2, information about a frequency location of at least one monitoring SB (at least one PDCCH candidate monitoring SB) among the one or more SBs in the BWP. Each SB in which each CORESET frequency resource is configured may be indicated as an SB requiring monitoring in the obtained information about the frequency location. The wireless communication device 1/2 may configure each CORESET frequency area in each SB of the BWP based on the CORESET frequency area of the single specific SB in the BWP, when the wireless communication device has obtained the information about the frequency location of the at least one monitoring SB.

The same antenna port quasi co-location (QCL) information may be applied to each CORESET frequency resource area configured in each SB of the BWP.

The wireless communication device 1 may receive at least one of the control channel SS configuration or the CORESET configuration from the wireless communication device 2.

Configuration of each CORESET frequency resource area in each SB of the BWP based on the CORESET frequency area of the specific one SB of the BWP may be allowed only when the control channel SS is a specific SS type.

The one or more SBs of the BWP may be LBT-based SBs. Each CORESET frequency area is an SB-based CORESET, and the CORESET may be a group of SB-based CORESETs configured in the BWP.

The wireless communication device 1 may wake up and monitor the control channel candidates during an On Duration of a DRX cycle.

The wireless communication device 1 may be a UE configured to operate in a 3GPP-based wireless communication system. The wireless communication device 2 may be a BS configured to operate in a 3GPP-based wireless communication system.

The control information may be DCI.

The control channel may be a PDCCH carrying the DCI.

Further, in one aspect of the present disclosure, a method performed by a device in a wireless communication system may include, as a part of an RRC connection process, receiving CORESET configuration information about a BWP, the CORESET configuration information including information about frequency resources of a CORESET, monitoring PDCCH candidates in one or more CORESETs in the BWP, and detecting a PDCCH based on the monitoring. Based on (i) the BWP including a plurality of SBs and (ii) the frequency resources being confined to one SB, the same CORESET may be configured in each SB of the BWP based on the frequency resources.

In another aspect of the present disclosure, a wireless device in a wireless communication system may include a memory and a processor. In a part of an RRC connection process, the processor may be configured to receive CORESET configuration information about a BWP, the CORESET configuration information including information about frequency resources of a CORESET, monitor PDCCH candidates in one or more CORESETs in the BWP, and detect a PDCCH based on the monitoring. Based on (i) the BWP including a plurality of SBs and (ii) the frequency resources being confined to one SB, the same CORESET may be configured in each SB of the BWP based on the frequency resources.

The RRC connection process may be performed through an RACH procedure.

The SB may include an LBT-BW.

Each SB may have the same frequency-domain size.

The information about the frequency resources of the CORESET may include information about an RB set.

Based on the frequency resources being larger than a single LBT band, only one CORESET may be configured in the BWP based on the frequency resources.

Based on the BWP operating in an LCell, only one CORESET may be configured in the BWP based on the frequency resources.

The device may include an autonomous driving vehicle communicable with at least a UE, a network, and another autonomous driving vehicle other than the wireless device.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, BSs, or other apparatuses in a wireless mobile communication system.

What is claimed is:

1. A method of receiving a signal by a wireless communication device, the method comprising:
monitoring control channel candidates in a bandwidth part (BWP) including a plurality of subbands (SBs) based on a control channel search space set (SS) configuration and a control resource set (CORESET) configuration which are associated with each other; and
obtaining control information from a control channel detected as a result of monitoring the control channel candidates,
wherein every CORESET frequency resource area in every SB of the BWP is configured based on a CORESET frequency resource area of only one SB located at a lowest frequency among the plurality of SBs included in the BWP.

2. The method according to claim 1, wherein each SB corresponds to a resource block (RB) set, and the only one SB is an RB set #0 having a lowest index in the BWP.

3. The method according to claim 1, wherein the control channel SS configuration includes information indicating at least one SB located at a frequency in which the wireless communication device is to monitor the control channel candidates among the plurality of SBs included in the BWP.

4. The method according to claim 3, wherein the wireless communication device configures a same CORESET frequency resource area as the CORESET frequency resource area of the only one SB in the at least one SB indicated by the control channel SS configuration.

5. The method according to claim 2, wherein the wireless communication device obtains information about a CORESET frequency resource area of the RB set #0 from the CORESET configuration, and applies the obtained information about the CORESET frequency resource area of RB set #0 commonly to each RB set for monitoring the control channels candidates.

6. The method according to claim 1, wherein the wireless communication device obtains information about the CORESET frequency resource area of the only one SB from a bitmap indicating CORESET frequency-domain resources included in the CORESET configuration.

7. The method according to claim 1, wherein each CORESET frequency resource area configured in each SB of the BWP is related to a same one CORESET index.

8. The method according to claim 1, wherein the wireless communication device applies same antenna port quasi co-location (QCL) information to each CORESET frequency resource area configured in each SB of the BWP.

9. The method according to claim 1, wherein the wireless communication device wakes up and monitors the control channel candidates during an On Duration of a discontinuous reception (DRX) cycle.

10. The method according to claim 1, wherein the wireless communication device is a user equipment (UE) configured to operate in a 3rd generation partnership project (3GPP)-based wireless communication system, the control information is downlink control information (DCI), and the control channel is a physical downlink control channel (PDCCH) carrying the DCI.

11. A non-transitory processor-readable recording medium recorded thereon a program for performing the method according to claim 1.

12. A device configured to process a signal in a wireless communication system, the device comprising:
at least one memory storing one or more instructions; and
at least one processor configured to execute the one or more instructions stored in the at least one memory to perform operations comprising:
monitoring control channel candidates in a bandwidth part (BWP) including a plurality of subbands (SBs) based on a control channel search space set (SS) configuration and a control resource set (CORESET) configuration which are associated with each other, and
obtaining control information from a control channel detected as a result of monitoring the control channel candidates,
wherein every CORESET frequency resource area in every SB of the BWP is configured based on a CORESET frequency resource area of only one SB located at a lowest frequency among the plurality of SBs included in the BWP.

13. A wireless communication device comprising:
a receiver; and
at least one processor configured to control the receiver,
wherein the at least one processor is configured to monitor control channel candidates in a bandwidth part (BWP) including a plurality of subbands (SBs) based on a control channel search space set (SS) configuration and a control resource set (CORESET) configuration which are associated with each other, and obtain control information from a control channel detected as a result of monitoring the control channel candidates,
wherein every CORESET frequency resource area in every SB of the BWP is configured based on a CORESET frequency resource area of only one SB located at a lowest frequency among the plurality of SBs included in the BWP.

14. A method of transmitting a signal by a wireless communication device, the method comprising:
selecting at least one of control channel candidates in a bandwidth part (BWP) including a plurality of subbands (SBs) based on a control channel search space set (SS) configuration and a control resource set (CORESET) configuration which are associated with each other; and
transmitting a control channel carrying control information in the at least one control channel candidate,
wherein every CORESET frequency resource area in every SB of the BWP is configured based on a CORESET frequency resource area of only one SB located at a lowest frequency among the plurality of SBs included in the BWP.

15. A wireless communication device comprising:
a transmitter; and
at least one processor configured to control the transmitter,
wherein the at least one processor is configured to select at least one of control channel candidates in a bandwidth part (BWP) including a plurality of subbands (SBs) based on a control channel search space set (SS) configuration and a control resource set (CORESET) configuration which are associated with each other, and transmit a control channel carrying control information in the at least one control channel candidate,
wherein every CORESET frequency resource area in every SB of the BWP is configured based on a CORESET frequency resource area of only one SB located at a lowest frequency among the plurality of SBs included in the BWP.

* * * * *